United States Patent
Matsunaga

(10) Patent No.: US 8,370,676 B2
(45) Date of Patent: Feb. 5, 2013

(54) RECEIVING APPARATUS AND TIME CORRECTION METHOD FOR RECEIVING APPARATUS

(75) Inventor: Osamu Matsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 506 days.

(21) Appl. No.: 12/709,972

(22) Filed: Feb. 22, 2010

(65) Prior Publication Data

US 2010/0250781 A1 Sep. 30, 2010

(30) Foreign Application Priority Data

Mar. 26, 2009 (JP) ................. 2009-076742

(51) Int. Cl.
*G06F 1/00* (2006.01)
*G06F 1/12* (2006.01)
*G06F 11/00* (2006.01)
*H04L 7/00* (2006.01)

(52) U.S. Cl. ................. 713/400; 713/500; 713/503

(58) Field of Classification Search .................. 713/400, 713/500, 503
See application file for complete search history.

(56) References Cited

U.S. PATENT DOCUMENTS

| | | | |
|---|---|---|---|
| 2003/0112758 A1* | 6/2003 | Pang et al. | 370/235 |
| 2004/0257469 A1 | 12/2004 | Compton et al. | |
| 2005/0232227 A1* | 10/2005 | Jorgenson et al. | 370/351 |
| 2006/0050649 A1* | 3/2006 | Botton-Dascal et al. | 370/252 |
| 2007/0064604 A1* | 3/2007 | Chen et al. | 370/230 |
| 2008/0002762 A1* | 1/2008 | Cranford et al. | 375/226 |

FOREIGN PATENT DOCUMENTS

JP 2004-304809 10/2004

* cited by examiner

*Primary Examiner* — Mark Connolly
(74) *Attorney, Agent, or Firm* — Oblon, Spivak, McClelland, Maier & Neustadt, L.L.P.

(57) ABSTRACT

A receiving apparatus includes: a clock unit that outputs time information; a synchronizing (sync) packet receiving unit that receives a sync packet which contains transmitting time information and which is sent from a transmitting apparatus over an asynchronous network; a magnitude-of-jitter calculation unit that calculates as a magnitude of a jitter a difference between a first difference, which is a difference between the receiving times of two adjoining sync packets received by the sync packet receiving unit, and a second difference which is a difference between the transmitting times of the two sync packets; a delay time estimation unit that obtains the delay time of the sync packet on the basis of magnitudes of jitters calculated by the magnitude-of-jitter calculation unit; and a time correction unit that compensates the transmitting time of the sync packet, which is received by the sync packet receiving unit, on the basis of the delay time of the sync packet, which is obtained by the delay time estimation unit, so as to obtain a compensated time, and rewrites and corrects the time of the clock unit with the compensated time.

17 Claims, 18 Drawing Sheets

FIG.18

SYNC PACKET

| ETHERNET FRAME HEADER | IP DATAGRAM HEADER | UDP HEADER | TIME STAMP DATA | MISCELLANEOUS DATA ITEMS | CRC |
|---|---|---|---|---|---|

RECEIVING APPARATUS AND TIME CORRECTION METHOD FOR RECEIVING APPARATUS

BACKGROUND OF THE INVENTION

1. Field of the Invention

The present invention relates to a receiving apparatus and a time correction method for the receiving apparatus. More particularly, the present invention is concerned with a receiving apparatus that corrects a time indicated by a clock unit by utilizing a synchronizing packet sent from a transmitting apparatus over an asynchronous network.

2. Description of the Related Art

In the past, a receiving apparatus including a clock unit which outputs time information has been known to correct a time indicated by the clock unit by utilizing a synchronizing packet sent from a transmitting apparatus over an asynchronous network.

FIG. 17 shows an example of the configuration of a receiving apparatus 400 in accordance with a related art. In FIG. 17, a portion of the receiving apparatus relating to time synchronization described in JP-A-2004-304809 is schematically shown. In the receiving apparatus 400, a synchronizing (hereinafter, sync) packet containing transmission time information is received from a transmitting apparatus over a local area network (LAN). A value indicated by a clock unit (counter) is rewritten with a time (counter value) represented by the transmission time information. Thus, the time indicated in the receiving apparatus is controlled to synchronize with the time indicated in the transmitting apparatus.

The receiving apparatus 400 includes a network interface 401, a sync packet receiving unit 402, a receiving time recording unit 403, and a time information recording unit 404. The receiving apparatus 400 further includes a magnitude-of-jitter calculation unit 405, an error calculation and digital-to-analog conversion (DAC) unit 406, and a clock generation unit 407, a clock unit 409, and a counter 408.

The clock unit 409 outputs time information. The clock unit 409 includes a counter that counts up responsively to a clock CLK generated by the clock generation unit 407. The counter 408 is a counter similar to the counter included in the clock unit 409, and counts up responsively to the clock CLK generated by the clock generation unit 407.

The sync packet receiving unit 402 receives a sync packet sent from a transmitting apparatus, which is not shown, via the network interface 401 over a LAN that is an asynchronous network. FIG. 18 shows an example of the structure of the sync packet. The sync packet includes an Ethernet frame header, an IP datagram header, a user datagram protocol (UDP) header, time stamp data, miscellaneous data items, and a cyclic redundancy check (CRC) character (a code for use in checking an error). The time stamp data is information representing the transmitting time of the sync packet.

The receiving time recording unit 403 records a counter value of the counter 408, which is obtained at a time point at which a sync packet is received by the sync packet receiving unit 402, as a receiving time. The time information recording unit 404 records a transmitting time represented by the time stamp data contained in the sync packet received by the sync packet receiving unit 402.

The magnitude-of-jitter calculation unit 405 calculates a magnitude of a jitter on the basis of the receiving times and transmitting times of two adjoining sync packets received by the sync packet receiving unit 402. In other words, the magnitude-of-jitter calculation unit 405 calculates as the magnitude of a jitter a difference between a first difference that is the difference between the receiving times and a second difference that is the difference between the transmitting times.

Now, assume that t(1), t(2), etc. denote receiving times and s(1), s(2), etc. denote transmitting times. Herein, the numeral in parentheses denotes a sample number assigned to a sync packet. For example, t(a) and s(a) shall denote the receiving time and transmitting time respectively of a certain sync packet, and t(b) and s(b) shall denote the receiving time and transmitting time respectively of a subsequent sync packet. In this case, the magnitude-of-jitter calculation unit 405 calculates a magnitude of a jitter according to an equation (1) presented below.

$$\text{Magnitude of a jitter} = t(b) - t(a) - (s(b) - s(a)) \quad (1)$$

After performing appropriate filtering processing on magnitudes of jitters calculated by the magnitude-of-jitter calculation unit 405, the error calculation and DAC unit 406 performs quantization, conversion into analog values, and low-pass filtering processing in that order so as to produce an error voltage VC. The error calculation and DAC unit 406 feeds the error voltage VC to the clock generation unit 407 as a control voltage for a clock frequency.

The clock generation unit 407 generates, as mentioned above, a clock CLK that is fed to the clock unit 409 and counter 408. The clock generation unit 407 is formed using, for example, a voltage-controlled crystal oscillator (VCXO).

Time synchronizing actions to be performed in the receiving apparatus 400 shown in FIG. 17 will be described below.

When a sync packet (see FIG. 18) sent from a transmitting apparatus via the network interface 401 over a LAN is received by the sync packet receiving unit 402, the counter value of the counter 408 is recorded as a receiving time in the receiving time recording unit 403. At this time, in the time information recording unit 404, a transmitting time represented by time stamp data contained in the received sync packet is recorded.

In the magnitude-of-jitter calculation unit 405, the receiving times recorded in the receiving time recording unit 403 and the transmitting times recorded in the time information recording unit 404 are used to calculate magnitudes of jitters according to the equation (1) to which the receiving times of two adjoining sync packets and the transmitting times thereof are assigned. Under a situation under which time synchronization is unsusceptible to a variation in a delay time of a sync packet occurring over the network, the magnitude of a jitter corresponds to an error in a clock frequency between transmitting and receiving sides. Under a situation under which time synchronization is susceptible to the variation in the delay time of a sync packet occurring over the network, the magnitude of a jitter corresponds to the combination of the error in the clock frequency between the transmitting and receiving sides, and the variation in the delay time.

The magnitudes of jitters calculated by the magnitude-of-jitter calculation unit 405 are fed to the error calculation and DAC unit 406. In the error calculation and DAC unit 406, after the magnitudes of jitters are subjected to appropriate filtering processing, quantization, conversion into analog values, and low-pass filtering processing are carried out in that order. Eventually, an error voltage VC is produced. The error voltage VC is fed to the clock generation unit 407, and used to control the frequency of the clock CLK to be generated by the clock generation unit 407. The counter 408, receiving time recording unit 403, magnitude-of-jitter calculation unit 405, error calculation and DAC unit 406, and clock generation unit 407 constitute a frequency-locked loop.

As mentioned above, when the frequency of the clock CLK generated by the clock generation unit 407 is controlled by the frequency-locked loop, the time (counter value) indicated by the clock unit 409 is corrected. Specifically, when a sync packet is received by the sync packet receiving unit 402, the time (counter value) of the clock unit 409 is rewritten with a transmitting time (counter value) represented by time stamp data contained in the sync packet. Thus, the time (counter value) of the clock unit 409 is controlled to synchronize with the time (counter value) indicated by a clock unit included in a transmitting apparatus that is not shown. Information on the time (counter value) of the clock unit 409 is fed to, for example, a sync signal generation unit that is not shown, and used to phase the sync signals employed in the receiving apparatus and transmitting apparatus respectively.

SUMMARY OF THE INVENTION

In the receiving apparatus 400 shown in FIG. 17, the foregoing frequency-locked loop is appropriately designed so that it will cope with both an error in a clock frequency and a variation in the delay time of a sync packet. When an adverse effect of the variation in the delay time is thus minimized, the clock frequency can be synchronized with a clock frequency on a transmitting side.

However, the time synchronizing processing of rewriting the time (counter value) of the clock unit 40 with the transmitting time (counter value) represented by time stamp data contained in a received sync packet is still susceptible to the variation in a delay time. Therefore, the sync signal having the phase thereof controlled with information on the time (counter value) of the clock unit 409 still contains a variation equivalent to the variation in the delay time.

Once the delay time of a sync packet can be measured in the receiving apparatus 400, when the time (counter value) indicated by the clock unit 409 is rewritten, each of the transmitting times s(1), s(2), etc. represented by time stamp data items contained in respective sync packets can be corrected with a value equivalent to the measured value. However, for measurement of the delay time, a clock unit (counter) that acts exactly identically to a clock unit incorporated in the transmitting apparatus has to be present in the receiving apparatus 400. Therefore, measuring the delay time does not help accomplish the object of time synchronization. A means for estimating the delay time according to another method is necessary.

It is desirable to minimize an adverse effect of a variation in a delay, which is incurred by a sync packet, in a case where the sync packet is used to correct a time indicated by a clock unit.

According to an embodiment of the present invention, there is provided a receiving apparatus including:

a clock unit that outputs time information;

a sync packet receiving unit that receives a sync packet which contains transmitting time information and is sent from a transmitting apparatus over an asynchronous network;

a magnitude-of-jitter calculation unit that calculates as a magnitude of a jitter a difference between a first difference, which is a difference between the receiving times of two adjoining sync packets received by the sync packet receiving unit, and a second difference which is a difference between the transmitting times of the two sync packets;

a delay time estimation unit that obtains the delay time of the sync packet on the basis of magnitudes of jitters calculated by the magnitude-of-jitter calculation unit; and a time correction unit that compensates the transmitting time of the sync packet, which is received by the sync packet receiving unit, on the basis of the delay time of the sync packet obtained by the delay time estimation unit so as to obtain a compensated time, and rewrites and corrects the time, which is indicated by the clock unit, with the compensated time.

According to the embodiment of the present invention, the delay time of a sync packet is estimated based on magnitudes of jitters. For example, magnitudes of jitters are cumulated and summated in order to obtain a cumulative summation value of magnitudes of jitters. The cumulative summation value of magnitudes of jitters is shifted so that the minimum value of the cumulative summation values of magnitudes of jitters will be equal to the minimum value of delay times. Eventually, the delay time of the sync packet is obtained. Herein, the minimum value of delay times shall be a fixed value measured and determined in advance or a varying value measured and determined by a delay measurement section. The transmitting time of a sync packet is compensated based on the estimated delay time of the sync packet in order to obtain a compensated time. A time indicated by the clock unit is rewritten and corrected with the compensated time.

The delay time of a sync packet thus estimated based on magnitudes of jitters includes a delay variation. Therefore, the compensated time obtained by compensating for the estimated delay time is a time obtained by compensating for the delay time including a variation in the delay time. Therefore, the time of the clock unit corrected while being rewritten with the compensated time is a time having an adverse effect of a delay variation, which is incurred by the sync packet, minimized, and highly precisely synchronizes with a time indicated by a clock unit incorporated in a transmitting apparatus.

According to another embodiment of the present invention, for example, the delay time estimation unit includes a validity-of-estimation decision block that outputs a decision signal which validates a period during which the cumulative summation value of magnitudes of jitters obtained by a cumulative summation block is equal to a minimum value detected by a minimum value detection block and invalidates the other period. The time correction unit may rewrite and correct the time of the clock unit with the compensated time during the period validated with the decision signal outputted from the validity-of-estimation determination block.

The delay time of a sync packet sent over an asynchronous network includes a fixed element and a varying element. A period during which the cumulative summation value of magnitudes of jitters is the minimum value is a period during which a stable state in which the delay time of the sync packet includes only the fixed element is attained, and during which the delay time of the sync packet takes on the minimum value of delay times. Therefore, when the time indicated by the clock unit is rewritten and corrected with the compensated time during the period, the time can be corrected more highly precisely.

According to another embodiment of the present invention, for example, the delay time estimation unit includes a designation block that designates a minimum-value range for magnitudes of jitters on the basis of at least the minimum value of the magnitudes of jitters calculated by the magnitude-of-jitter calculation unit, and a validity-of-estimation decision block that outputs a decision signal which validates a period during which the magnitude of a jitter calculated by the magnitude-of-jitter calculation unit falls within the minimum-value range designated by the designation block, and invalidates the other period. The time correction unit may rewrite and correct the time of the clock unit with the compensated time during the period validated with the decision signal outputted from the validity-of-estimation decision block.

The delay time of a sync packet sent over an asynchronous network includes a fixed element and a varying element.

During a period during which a magnitude of a jitter falls within the minimum-value range, a nearly stable state in which the varying element of the delay time of a sync packet is small is attained. Therefore, when the time indicated by the clock unit is rewritten and corrected with the compensated time during the period, the time can be corrected more highly precisely.

According to another embodiment of the present invention, for example, the delay time estimation unit includes: a cumulative summation block that cumulates and summates magnitudes of jitters calculated by the magnitude-of-jitter calculation unit so as to obtain a cumulative summation value of magnitudes of jitters; a minimum value detection block that detects the minimum value of the cumulative summation values of magnitudes of jitters obtained by the cumulative summation block; a validity-of-estimation decision block that outputs a decision signal which validates a period during which the cumulative summation value of magnitudes of jitters obtained by the cumulative summation block is equal to the minimum value detected by the minimum value detection block, and invalidates the other period; and an output block that outputs the minimum value of delay times as the delay time of a sync packet during the period validated with the decision signal outputted from the validity-of-estimation decision block. The time correction unit may rewrite and correct the time of the clock unit with the compensated time during the period validated with the decision signal outputted from the validity-of-estimation decision block.

The delay time of a sync packet sent over an asynchronous network includes a fixed element and a varying element. During a period during which the cumulative summation value of magnitudes of jitters is the minimum value, a stable state in which the delay time of the sync packet includes only the fixed element is attained, and the delay time of the sync packet takes on the minimum value of delay times. Therefore, when the time indicated by the clock unit is rewritten and corrected with the compensated time during the period, the time can be corrected more highly precisely.

According to another embodiment of the present invention, for example, the delay time estimation unit includes: a designation block that designates a minimum-value range for magnitudes of jitters on the basis of at least the minimum value of magnitudes of jitters calculated by the magnitude-of-jitter calculation unit; a validity-of-estimation decision block that outputs a decision signal which validates a period during which the magnitude of a jitter calculated by the magnitude-of-jitter calculation unit falls within the minimum-value range designated by the designation block, and invalidates the other period; and an output block that outputs the minimum value of delay times as the delay time of a sync packet during the period validated with the decision signal outputted from the validity-of-estimation decision block. The time correction unit may rewrite and correct the time of the clock unit with the compensated time during the period validated with the decision signal outputted from the validity-of-estimation decision block.

The delay time of a sync packet sent over an asynchronous network includes a fixed element and a varying element. During a period during which a magnitude of a jitter falls within the minimum-value range, a nearly stable state in which the varying element of the delay time of the sync packet is small is attained. Therefore, when the time indicated by the clock unit is rewritten and corrected with the compensated time during the period, the time can be corrected more highly precisely.

According to another embodiment of the present invention, when the time indicated by the clock unit is corrected by utilizing a sync packet, the delay time of the sync packet is estimated based on magnitudes of jitters. The transmitting time is compensated for the estimated value and thus corrected. Therefore, an adverse effect of a variation in a delay incurred by the sync packet can be minimized, and time synchronization can be highly precisely achieved with respect to a transmitting apparatus.

BRIEF DESCRIPTION OF THE DRAWINGS

FIG. 18 is a diagram showing an example of the structure of a sync packet to be transmitted from a transmitting apparatus to a receiving apparatus.

DETAILED DESCRIPTION OF THE INVENTION

Modes for carrying out the invention (hereinafter, embodiments) will be described below. A description will proceed by sequentially following subjects presented below.

1. First Embodiment

[Example of the Configuration of a Receiving Apparatus]

Figure 1:
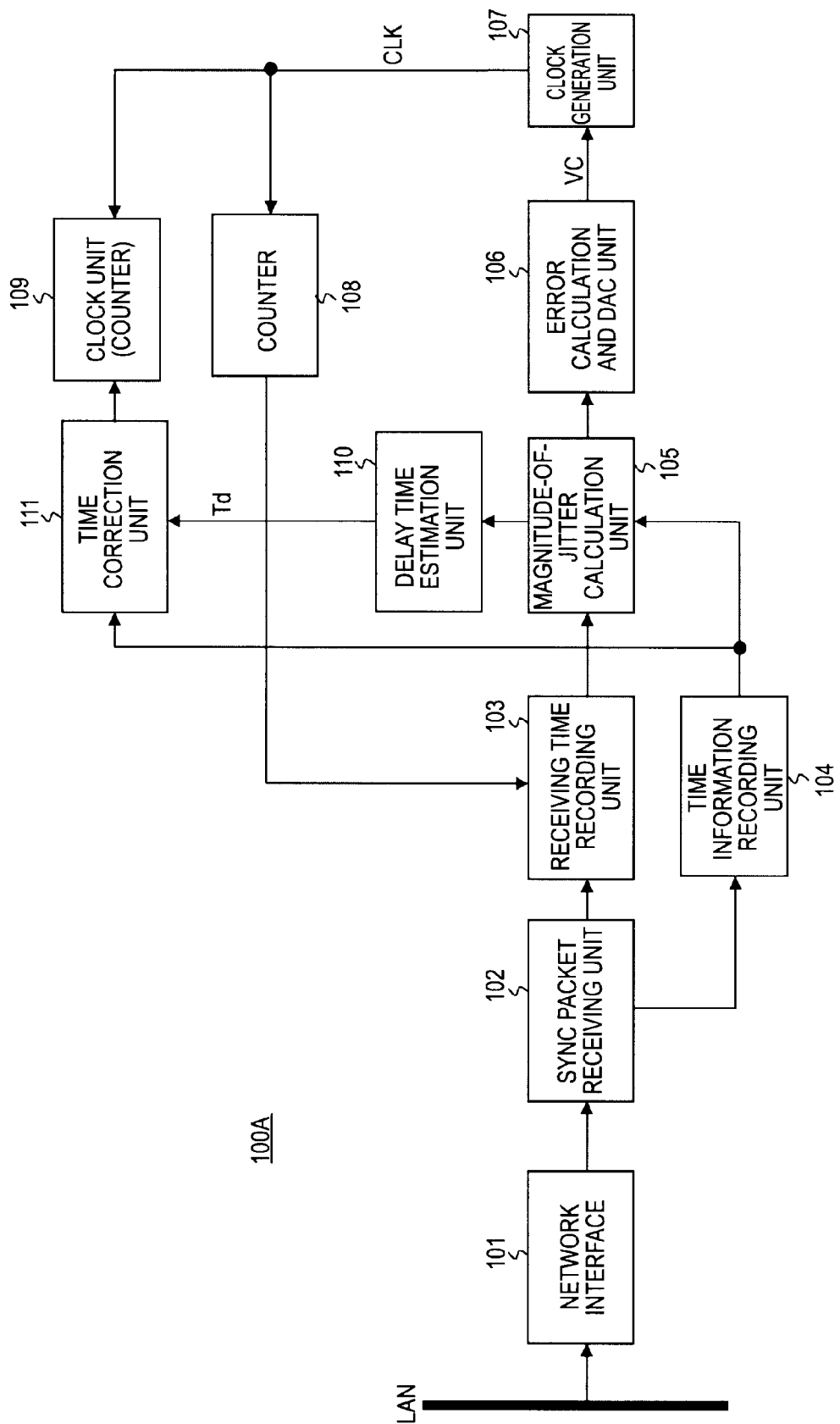
FIG. 1 is a block diagram showing an example of the configuration of a receiving apparatus in accordance with a first embodiment of the present invention.

FIG. 1 shows an example of the configuration of a receiving apparatus 100A in accordance with the first embodiment of the present invention. For brevity's sake, only a portion of the receiving apparatus 100A relating to time synchronization is shown in FIG. 1.

The receiving apparatus 100A includes a network interface 101, a sync packet receiving unit 102, a receiving time recording unit 103, and a time information recording unit 104. The receiving apparatus 100A further includes a magnitude-of-jitter calculation unit 105, an error calculation and digital-to-analog conversion (DAC) unit 106, a clock generation unit 107, a clock unit (counter) 109, a counter 108, a delay time estimation unit 110, and a time correction unit 111.

The clock unit 109 outputs time information. The clock unit 109 includes a counter that counts up responsively to a clock CLK generated by the clock generation unit 107. The time information (counter value) provided by the clock unit 109 is fed to, for example, a synchronizing (sync) signal generation unit that is not shown, and used to phase sync signals, which are employed in the receiving apparatus and a transmitting apparatus respectively, with each other. The counter 108 is a counter similar to the counter included in the clock unit 109, and counts up responsively to the clock CLK generated by the clock generation unit 107.

The sync packet receiving unit 102 receives a sync packet (see FIG. 18) sent from the transmitting apparatus that is not shown via the network interface 101 over a local area network (LAN) that is an asynchronous network.

The receiving time recording unit 103 records a counter value of the counter 108 as a receiving time at a time point at which a sync packet is received by the sync packet receiving unit 102. The time information recording unit 104 records a transmitting time represented by time stamp data contained in the sync packet received by the sync packet receiving unit 102.

The magnitude-of-jitter calculation unit 105 calculates a magnitude of a jitter on the basis of the receiving times and transmitting times of two adjoining sync packets received by the sync packet receiving unit 102. In other words, the magnitude-of-jitter calculation unit 105 calculates as a magnitude of a jitter a difference between a first difference, which is a difference between the receiving times, and a second difference that is a difference between the transmitting times.

Assume that t(1), t(2), etc. denote receiving times, and s(1), s(2), etc. denote transmitting times. Herein, the numeral in parentheses denotes a sample number assigned to a sync packet. For example, t(a) shall denote the receiving time of a certain sync packet and s(a) shall denotes the transmitting time thereof, and t(b) shall denote the receiving time of a subsequent sync packet and s(b) shall denote the transmitting time thereof. In this case, the magnitude-of-jitter calculation unit 105 calculates a magnitude of a jitter according to an equation (2) presented below.

$$\text{Magnitude of jitter} = t(b) - t(a) - (s(b) - s(a)) \quad (2)$$

After performing appropriate filtering processing on magnitudes of jitters calculated by the magnitude-of-jitter calculation unit 105, the error calculation and DAC unit 106 performs quantization, conversion into analog values, and low-pass filtering processing in that order so as to produce an error voltage VC. The error calculation and DAC unit 106 feeds the error voltage VC to the clock generation unit 107 as a control voltage for a clock frequency.

The clock generation unit 107 generates, as mentioned above, the clock CLK to be fed to the clock unit 109 and counter 108. The clock generation unit 107 is formed using, for example, a voltage-controlled crystal oscillator (VCXO).

The delay time estimation unit 110 obtains the delay time Td of a sync packet on the basis of magnitudes of jitters calculated by the magnitude-of-jitter calculation unit 105. The delay time estimation unit 110 will be detailed later.

The time correction unit 111 compensates a transmitting time, which is represented by time stamp data contained in a sync packet received by the sync packet receiving unit 102, on the basis of the delay time Td of the sync packet obtained by the delay time estimation unit 110, and thus obtains a compensated time. In this case, the time correction unit 111 adds the delay time Td, which is obtained by the delay time estimation unit 110, to the transmitting time of a certain sync packet so as to obtain the compensated time. The time correction unit 111 may rewrite and correct the time (counter value) of the clock unit 109 with the compensated time (counter value).

[Principles of Estimation of a Delay Time]

The principles of estimation of a delay time to be performed by the delay time estimation unit 110 included in the receiving apparatus 100A shown in FIG. 1 will be described below.

Figure 2:
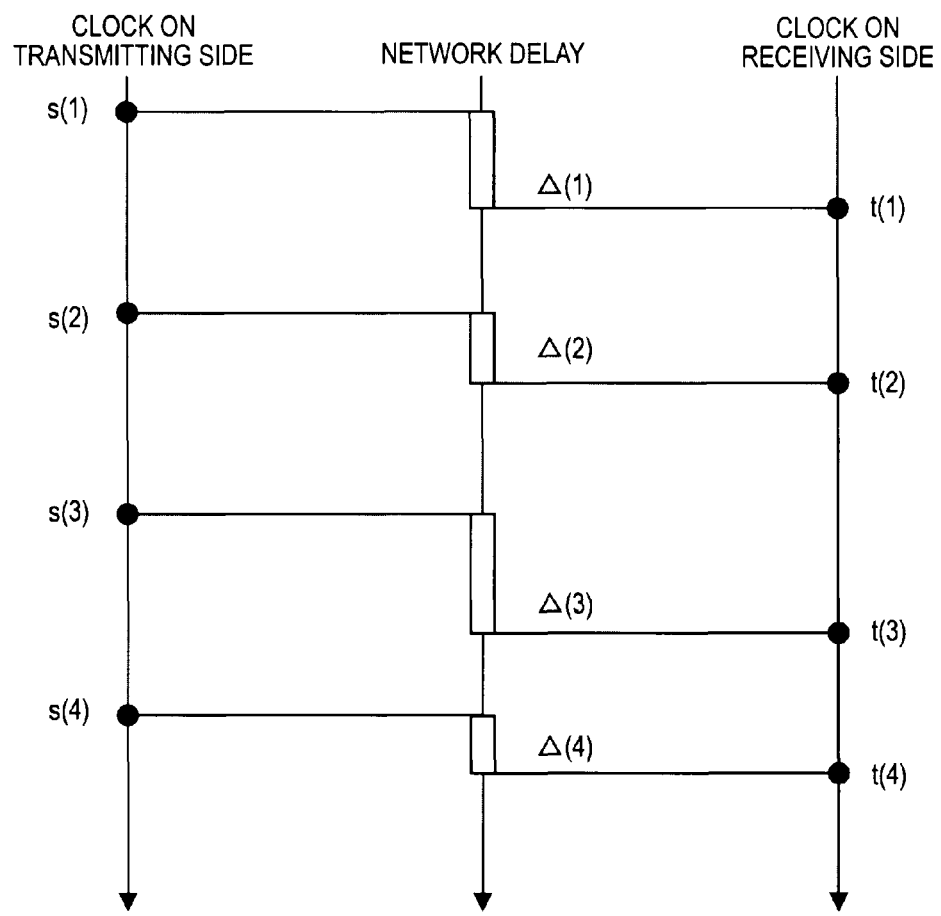
FIG. 2 is a diagram for use in explaining the nature of the delay time of a sync packet.

Referring to FIG. 2, the nature of delay times $\Delta(1)$, $\Delta(2)$, etc. of sync packets will be described below. The numeral in parentheses denotes a sample number assigned to a sync packet. Noted is that a delay time occurring over a network depends on the length of a LAN cable, network elements including switches, and the size of a sync packet. For brevity's sake, in FIG. 2, the delay time is thought to derive from the switches alone.

Over a network over which a sync packet and another packet, for example, a video signal packet are transmitted via the same output port of a switch, as long as the transmission of the sync packet does not coincide with the transmission of another packet, the transmission of the sync packet is executed immediately. However, the transmission of the sync packet coincides with the transmission of another packet, the transmission of the sync packet is retarded. The output wait time depends on a time necessary to transmit another packet, and is not constant. Therefore, not only a constant passage delay but also delay variations expressed with equations (3) presented below are observed on a receiving side.

$$t(1) - s(1) = \Delta(1) + \text{offset}(1)$$

$$t(2) - s(2) = \Delta(2) + \text{offset}(2)$$

$$t(3) - s(3) = \Delta(3) + \text{offset}(3)$$

$$t(4) - s(4) = \Delta(4) + \text{offset}(4) \quad (3)$$

The clocks incorporated on transmitting and receiving sides respectively are different from each other in terms of a value (time) and a way of advancement (length of 1 sec). Therefore, offsets offset(1), offset(2), offset(3), offset(4), etc. take on different values. However, if a requirement that the values offset(1), offset(2), offset(3), offset(4), etc. are approximately equal to one another is satisfied under a certain condition, magnitudes of jitters expressed by equations (4) below are observed on the receiving side. The certain condition is such that locking a clock frequency is achieved prior to time synchronization, or a sync packet is produced at intervals of a short time that is so short that the difference between offsets relevant to samples is small enough.

$$t(2)-s(2)-(t(1)-s(1))=\Delta(2)-\Delta(1)$$

$$t(3)-s(3)-(t(2)-s(2))=\Delta(3)-\Delta(2)$$

$$t(4)-s(4)-(t(3)-s(3))=\Delta(4)-\Delta(3). \quad (4)$$

The cumulative summations of magnitudes of jitters expressed by the above equations (4) are expressed by equations (5) below.

$$\{t(2)-s(2)-(t(1)-s(1))\}+\{t(3)-s(3)-(t(2)-s(2))\}= \quad (5)$$

$$\{\Delta(2)-\Delta(1)\}+\{\Delta(3)-\Delta(2)\}=\Delta(3)-\Delta(1)$$

$$\{t(2)-s(2)-(t(1)-s(1))\}+\{t(3)-s(3)-(t(2)-s(2))\}+$$

$$\{t(4)-s(4)-(t(3)-s(3))\}=$$

$$\{\Delta(2)-\Delta(1)\}+\{\Delta(3)-\Delta(2)\}+\{\Delta(4)-\Delta(3)\}=\Delta(4)-\Delta(1)$$

As apparent from the equations (5), through the cumulative summation of magnitudes of jitters, a variation in the delay time of a sample is, as expressed by an equation (6) below, obtained as a shift of a value $\Delta(1)$.

$$\sum_{i=2}^{n}\{t(i)-s(i)-(t(i-1)-s(i-1))\}=\Delta(n)-\Delta(1) \quad (6)$$

The delay time can be obtained by compensating for the shift value $\Delta(1)$. For measurement of the $\Delta(1)$ value, a clock unit (counter) that operates identically to the clock unit incorporated in a transmitting apparatus has to exist in the receiving apparatus 100A. Therefore, the $\Delta(1)$ value will not be measured. Namely, a compensation value equivalent to the shift value has to be estimated by employing another means.

As mentioned above, as long as the transmission of a sync packet does not coincide with the transmission of another packet, the transmission of the sync packet can be immediately executed. This means that a situation in which the minimum value of delay times remains constant is set up by determining the specifications for network elements and for the sync packet. Therefore, the minimum value of delay times measured separately is recorded, and the value provided by the equation (6) is compensated so that the minimum value provided by the equation (6) will be equal to the minimum value of delay times measured separately. Thus, the delay time can be estimated.

Now, the minimum value of delay times measured separately is comparable to a delay time arisen in a state in which a sync packet alone is transmitted or received, and can therefore be readily measured in advance using an appropriate measuring instrument. In a highly loaded state in which all sync packets or a considerable number of sync packets are put to an output wait state, it is hard to estimate the delay time. Otherwise, the estimation technique will prove effective.

Since magnitudes of jitters are cumulated, an adverse effect of cumulation of estimated errors caused by repeating estimation until estimation of a value $\Delta(N)$ where N denotes the upper limit of the number of samples to be cumulated can be reduced. Resetting the cumulation at a time point at which a missing sync packet is detected based on discontinuity in an ID number or a sequence number specified in a packet would prove effective in avoiding the cumulation of errors.

Figure 3:
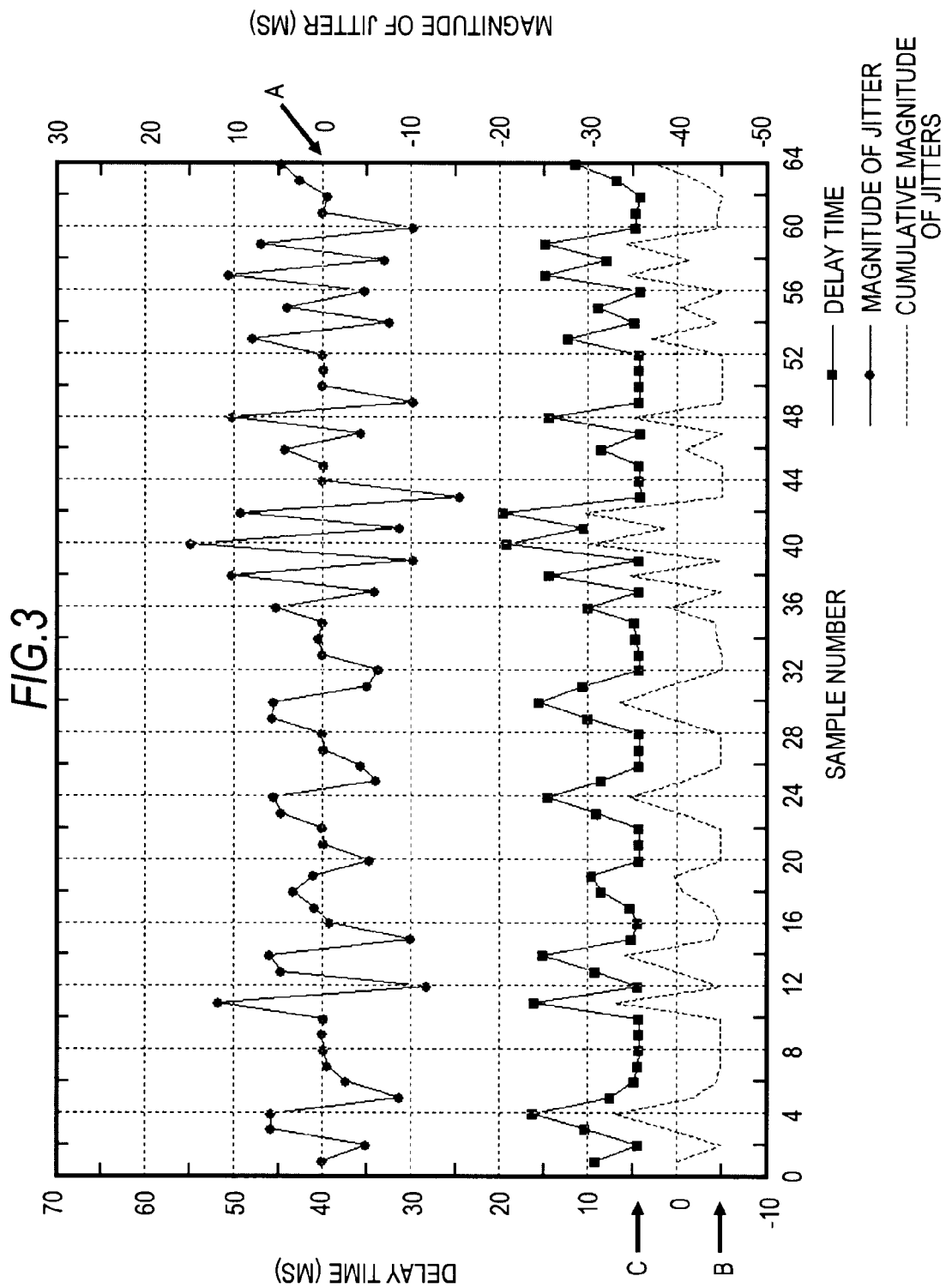
FIG. 3 is a diagram showing an example of the relationship among a magnitude of a jitter, a cumulative magnitude of jitters, and a delay time which is established in a state in which an offset between the values indicated by clocks located on transmitting and receiving sides respectively is null.

FIG. 3 shows an example of a relationship among a magnitude of a jitter, a cumulative magnitude of jitters, and a delay time which is established in a state in which an offset between values indicated by clocks incorporated on transmitting and receiving sides respectively is null. A magnitude of a jitter measurable on the receiving side varies depending on a sample of a sync packet with A=0 ms as a center. The cumulative magnitudes of jitters having magnitudes of jitters cumulated have a minimum value B and vary along with a change of delay times that have a minimum value C. In this example, the minimum value B is on the order of −5 ms and the minimum value C is on the order of +4 ms. Therefore, for all the samples, when the cumulative magnitudes of jitters are compensated by +9 ms, the delay times of the samples can be estimated.

[Example of the Configuration of a Delay Time Measurement System]

Figure 4:
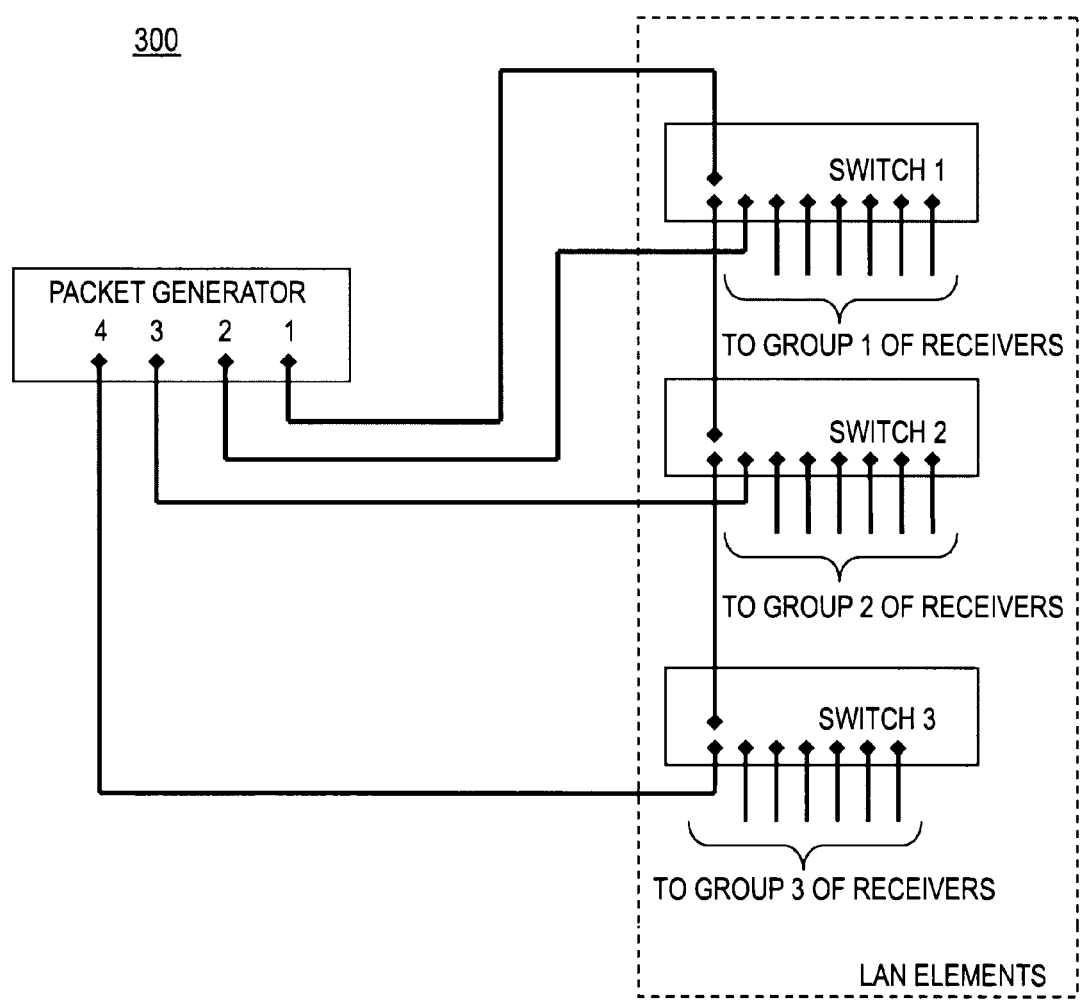
FIG. 4 is a diagram showing an example of the configuration of a delay time measurement system for measuring a minimum value of delay times.

FIG. 4 shows an example of the configuration of a delay time measurement system 300 for measuring the minimum value of delay times. The delay time measurement system 300 has a LAN constructed with three stages of switches, and measures a delay time using a locally procurable network measuring instrument (packet generator).

A port 1 of the packet generator is connected to a switch port via which a transmitter is connected, and a time stamp is specified in a packet analogous to a sync packet so that the packet will be cyclically transmitted. A group 1 of receivers, a group 2 of receivers, and a group 3 of receivers are different from one another in terms of a delay time. The switch ports of the switches are connected to the ports 2, 3, and 4 of the packet generator so that the packet analogous to the sync packet can be received via the switches.

The packet generator calculates and outputs a delay time that is a difference between a packet receiving time and a time stamp value specified in a packet. If measurement is performed in a state in which only the packet analogous to a sync packet is communicated, the delay time to be outputted takes on the minimum value of delay times. In this example, the minimum value of delay times that should be designated (minimum delay value) is selected depending on to which of the groups of receivers a receiver belongs.

[Example of the Configuration of the Delay Time Estimation Unit]

Figure 5:
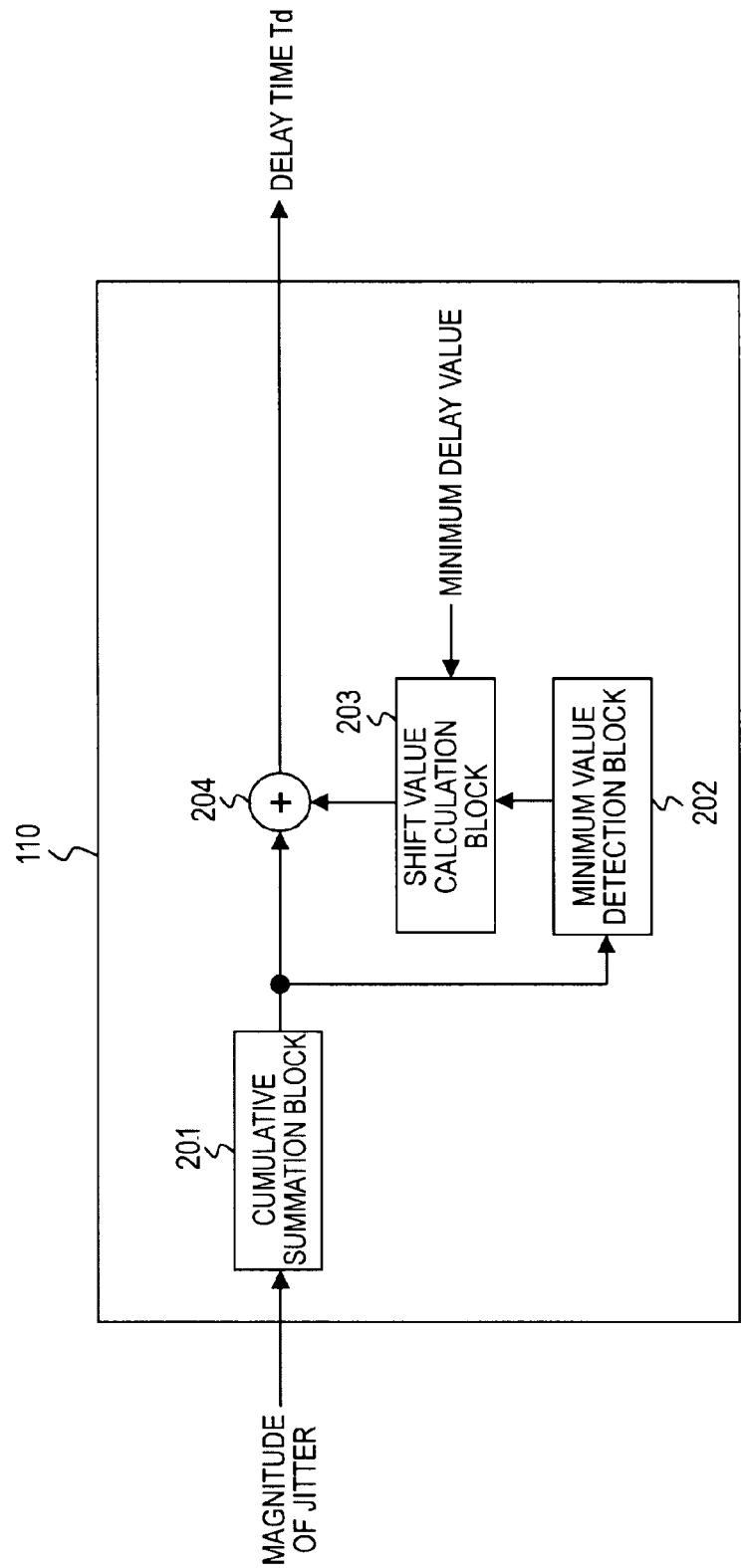
FIG. 5 is a block diagram showing an example of the configuration of a delay time estimation unit included in the first embodiment.

FIG. 5 shows an example of the configuration of the delay time estimation unit 110 adopting the foregoing principles of estimation of a delay time. The delay time estimation unit 110 includes a cumulative summation block 201, a minimum value detection block 202, a shift value calculation block 203, and a shift computation block 204.

The cumulative summation block 201 cumulates and summates magnitudes of jitters calculated by the magnitude-of-jitter calculation unit 105 (see FIG. 1) so as to obtain a cumulative magnitude of jitters (a cumulative summation value of magnitudes of jitters). The minimum value detection block 202 detects the minimum value of cumulative magnitudes of jitters obtained by the cumulative summation block 201.

The shift value calculation block 203 calculates a difference between the minimum value of cumulative magnitudes of jitters, which is detected by the minimum value detection block 202, and the minimum value of delay times measured and determined in advance (minimum delay value), so as to thus calculate a shift value. The minimum delay value is a fixed value. According to the relationship shown in FIG. 3, the minimum value of cumulative magnitudes of jitters is the value B, and the minimum delay value is the value C. Therefore, (C−B) is calculated as the shift value.

The shift computation block 204 adds the shift value, which is calculated by the shift value calculation block 203, to the cumulative magnitude of jitters for each sample obtained by the cumulative summation block 201. In this case, the shift computation block 204 compensates the cumulative magnitudes of jitters relevant to all samples for the shift value, and thus obtains the delay times (estimated delay times) of the samples.

Actions to be performed in the delay time estimation unit 110 shown in FIG. 5 will be described below. A magnitude of a jitter calculated by the magnitude-of-jitter calculation unit 105 (see FIG. 1) is fed to the cumulative summation block 201. The cumulative summation block 201 cumulates and summates magnitudes of jitters for each sample so as to obtain a cumulative magnitude of jitters (cumulative summation value of magnitudes of jitters). The cumulative magnitude of jitters is fed to the minimum value detection block 202 and shift computation block 204.

The minimum value computation block 202 detects the minimum value of the cumulative magnitudes of jitters obtained by the cumulative summation block 201. The minimum value of cumulative magnitudes of jitters is fed to the shift value calculation block 203. The shift value calculation block 203 calculates the difference between the minimum value of cumulative magnitudes of jitters and the minimum delay value (fixed value) so as to thus calculate a shift value.

The shift value calculated by the shift value calculation block 203 is fed to the shift computation block 204. The shift computation block 204 adds the shift value, which is calculated by the shift value calculation block 203, to the cumulative magnitude of jitters for each sample calculated by the cumulative summation block 201. Eventually, the shift computation block 204 compensates the cumulative magnitudes of jitters relevant to all samples for the shift value, and thus obtains the delay times (estimated delay times) Td of the samples.

[Actions to be Performed in the Receiving Apparatus]

Time synchronizing actions to be performed in the receiving apparatus 100A shown in FIG. 1 will be described below.

When a sync packet (see FIG. 18) sent from a transmitting apparatus via the network interface 101 over a LAN is received by the sync packet receiving unit 102, the counter value of the counter 108 is recorded as a receiving time in the receiving time recording unit 103. At this time, a transmitting time represented by time stamp data contained in the sync packet is recorded in the time information recording unit 104.

In the magnitude-of-jitter calculation unit 105, the receiving times recorded in the receiving time recording unit 103 and the transmitting times recorded in the time information recording unit 104 are used to calculate magnitudes of jitters according to the aforesaid equation (2) to which the receiving times and transmitting times of two adjoining sync packets are assigned. The magnitude of a jitter is comparable to an error in a clock frequency between transmitting and receiving sides under a situation under which time synchronization is unsusceptible to a variation in the delay time of a sync packet occurring over a network. Under a situation under which time synchronization is susceptible to the variation in the delay time of a sync packet occurring over the network, the magnitude of a jitter is comparable to the combination of the error in the clock frequency between the transmitting and receiving sides and an adverse effect of the variation in the delay time.

The magnitudes of jitters calculated by the magnitude-of-jitter calculation unit 105 are fed to the error calculation and DAC unit 106. In the error calculation and DAC unit 106, after appropriate filtering processing is performed on the magnitudes of jitters, quantization, conversion into analog values, and low-pass filtering processing are carried out in that order in order to produce an error voltage VC. The error voltage VC is fed to the clock generation unit 107, whereby the frequency of a clock CLK generated by the clock generation unit 107 is controlled. The counter 108, receiving time recording unit 103, magnitude-of-jitter calculation unit 105, error calculation and DAC unit 106, and clock generation unit 107 constitute a frequency-locked loop.

The magnitudes of jitters calculated by the magnitude-of-jitter calculation unit 105 are fed to the delay time estimation unit 110. The delay time estimation unit 110 obtains the delay time Td of each sample, which is a sync packet received by the sync packet receiving unit 102, on the basis of the magnitudes of jitters. The delay time Td is a time elapsing until the sync packet sent from the transmitting apparatus is received by the sync packet receiving time 102.

The delay times Td of sync packets obtained by the delay time estimation unit 110 are fed to the time correction unit 111. In the time correction unit 111, the delay time Td of a sync packet estimated by the delay time estimation unit 110 is added to the transmitting time represented by time stamp data contained in the sync packet received by the sync packet receiving unit 102 in order to thus obtain a compensated time (counter value). The time correction unit 111 rewrites the time (counter value) of the clock unit 109 with the compensated time (counter value), whereby the time indicated by the clock unit 109 is controlled to synchronize with the time indicated by a clock unit incorporated in the transmitting apparatus.

Processing of estimating the delay time Td to be performed by the delay time estimation unit 110, and processing of correcting the time of the clock unit 109 to be performed by the time correction unit 111 are invoked by the receiving apparatus 100A, and carried out after a frequency-locked state is established by the frequency-locked loop. In the frequency-locked state, the aforesaid offsets offset(1), offset(2), offset(3), offset(4), etc. are equal to one another. The cumulative magnitude of jitters in the frequency-locked state is, as described in conjunction with the principles of estimation of a delay time, comparable to a variation in a delay of each sample that is a sync packet (refer to the equation (6)).

In a situation in which the clock frequency is not locked, the value offset(1) is smaller than the value offset(2), the value offset(2) is smaller than the value offset(3), the value offset(3) is smaller than the value offset(4), etc. Otherwise, the value offset(1) is larger than the value offset(2), the value offset(2) is larger than the value offset(3), the value offset(3) is larger than the value offset(4), etc. Therefore, the values of the delay time Td obtained by the delay time estimation unit 110 greatly vary according to either of the tendencies. Whether the frequency-locked state is established is decided by observing, for example, the output of the error calculation and DAC unit 106. Eventually, an initiation time point at which time rewriting is validated can be determined.

In the receiving apparatus 100A shown in FIG. 1, the delay time Td of a sync packet estimated based on magnitudes of jitters by the delay time estimation unit 110 includes a delay variation. Therefore, a compensated time obtained by the time correction unit 111 is a time obtained by compensating for the delay time including the variation in the delay time. Therefore, the time of the clock unit 109 corrected while being rewritten with the compensated time has an adverse effect of the delay variation, which is incurred by the sync packet, minimized, and highly precisely synchronizes with the time indicated by the clock unit incorporated in the transmitting apparatus.

2. Second Embodiment

[Example of the Configuration of a Receiving Apparatus]

Figure 6:
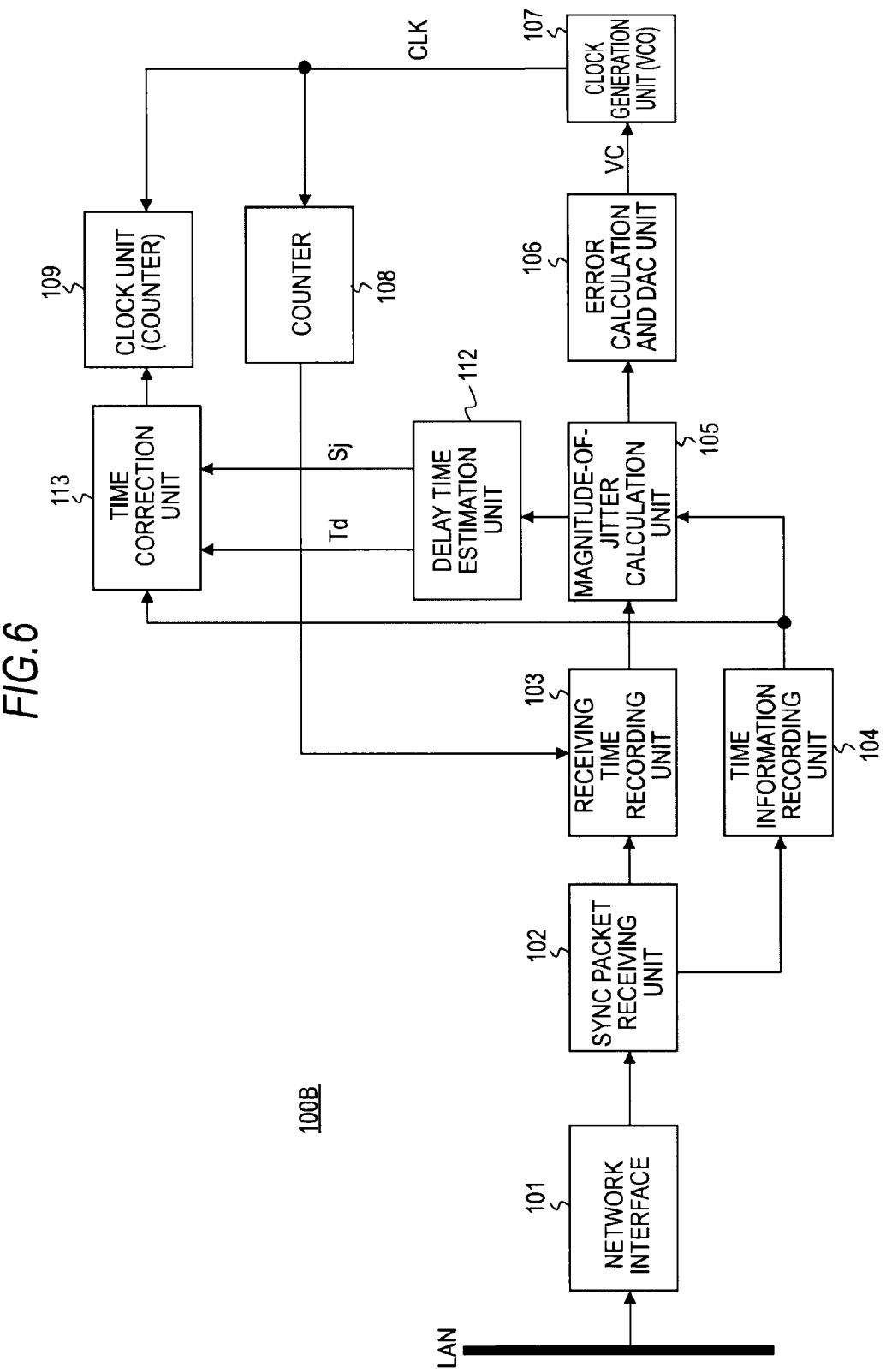
FIG. 6 is a block diagram showing an example of the configuration of a receiving apparatus in accordance with a second embodiment of the present invention.

FIG. 6 shows an example of the configuration of a receiving apparatus 100B in accordance with the second embodiment of the present invention. Even in FIG. 6, similarly to FIG. 1 showing the receiving apparatus 100A, only a portion of the receiving apparatus 100B relating to time synchronization is shown for brevity's sake. In FIG. 6, the same reference numerals are assigned to components identical to those shown in FIG. 1. An iterative description will be omitted.

The receiving apparatus 100B includes a network interface 101, a sync packet receiving unit 102, a receiving time recording unit 103, and a time information recording unit 104. The receiving apparatus 100B further includes a magnitude-of-jitter calculation unit 105, an error calculation and DAC unit 106, a clock generation unit 107, a clock unit (counter) 109, a counter 108, a delay time estimation unit 112, and a time correction unit 113.

The receiving apparatus 100B has the same configuration as the receiving apparatus 100A shown in FIG. 1 except that the delay time estimation unit 110 and time correction unit 111 are replaced with the delay time estimation unit 112 and time correction unit 113 respectively. The other components of the receiving apparatus 100B are identical to those of the receiving apparatus 100A shown in FIG. 1, though the description of the components will be omitted.

The delay time estimation unit 112 obtains the delay time Td of a sync packet on the basis of magnitudes of jitters calculated by the magnitude-of-jitter calculation unit 105. The delay time estimation unit 112 outputs a decision signal Sj signifying validation or invalidation. The delay time estimation unit 112 will be detailed later.

The time correction unit 113 performs compensated time calculating processing and time correcting processing during a period validated with the validation/invalidation decision signal Sj outputted from the delay time estimation unit 112. The compensated time calculating processing and time correcting processing are identical to those performed by the time correction unit 111 included in the receiving apparatus 100A shown in FIG. 1. However, the time correction unit 113 is different from the time correction unit 111 in a point that the time correction unit 113 performs the pieces of processing during the period validated with the validation/invalidation decision signal Sj.

During compensated time calculating processing, the time correction unit 113 compensates a transmitting time, which is represented by time stamp data contained in a sync packet received by the sync packet receiving unit 102, on the basis of the delay time Td of the sync packet estimated by the delay time estimation unit 112, and thus obtains a compensated time. In this case, the time correction unit 113 adds the delay time Td, which is estimated by the delay time estimation unit 112, to the transmitting time of a certain packet so as to obtain the compensated time. The time correction unit 113 rewrites the time (counter value) of the clock unit 109 with the compensated time (counter value) so as to thus correct the time.

[Example of the Configuration of the Delay Time Estimation Unit]

Figure 7:
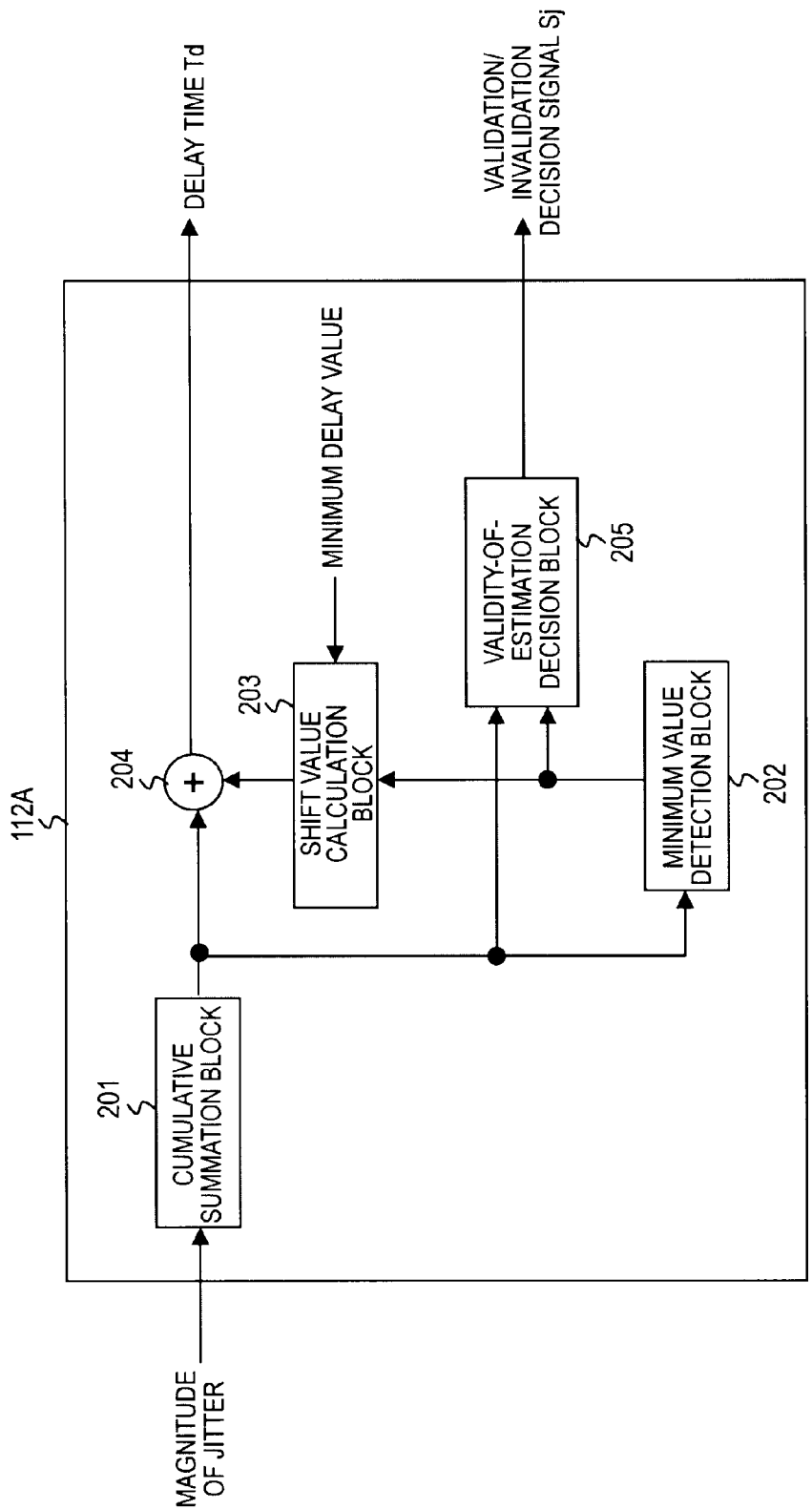
FIG. 7 is a block diagram showing an example of the configuration of a delay time estimation unit included in the second embodiment.

A delay time estimation unit 112A shown in FIG. 7 expresses an example of the configuration of the delay time estimation unit 112 included in the receiving apparatus 100B shown in FIG. 6. In FIG. 7, the same reference numerals are assigned to components identical to those shown in FIG. 5.

The delay time estimation unit 112A includes a cumulative summation block 201, a minimum value detection block 202, a shift value calculation block 203, a shift computation block 204, and a validity-of-estimation decision block 205. The delay time estimation unit 112A has the same components as the delay time estimation unit 110 shown in FIG. 5 does except that the delay time estimation unit 112A further includes the validity-of-estimation decision block 205. The validity-of-estimation deciding block 205 will be described below, but the description of the other components will be omitted.

The validity-of-estimation decision block 205 decides a period, during which the cumulative summation value of magnitudes of jitters obtained by the cumulative summation unit 201 (cumulative magnitude of jitters) is a minimum value, on the basis of the minimum value detected by the minimum value detection block 202. The validity-of-estimation decision block 205 outputs a validation/invalidation decision signal Sj which validates a period during which the cumulative summation value of magnitudes of jitters (cumulative magnitude of jitters) is the minimum value and invalidates the other period.

Actions to be performed in the delay time estimation unit 112A shown in FIG. 7 will be described below. The magnitudes of jitters calculated by the magnitude-of-jitter calculation unit 105 (see FIG. 6) are fed to the cumulative summation block 201. The cumulative summation block 201 cumulates and summates the magnitudes of jitters for each sample that is a sync packet so as to obtain a cumulative magnitude of jitters. The cumulative magnitudes of jitters are fed to the minimum value detection block 202 and shift computation block 204.

The minimum value computation block 202 detects the minimum value of the cumulative magnitudes of jitters obtained by the cumulative summation block 201. The minimum value of the cumulative magnitudes of jitters is fed to the shift value calculation block 203. The shift value calculation block 203 calculates the difference between the minimum value of the cumulative magnitudes of jitters and a minimum delay value, and thus calculates a shift value.

The shift value calculated by the shift value calculation block 203 is fed to the shift computation block 204. The shift computation block 204 adds the shift value, which is calculated by the shift value calculation block 203, to the cumulative magnitude of jitters for each sample obtained by the cumulative summation block 201. Accordingly, the cumulative magnitudes of jitters for all samples are compensated for the shift value by the shift computation block 204, whereby the delay times (estimated delay times) Td of the samples are obtained.

The cumulative magnitudes of jitters obtained by the cumulative summation block 201 and the minimum value of the cumulative magnitudes of jitters detected by the minimum value detection block 202 are fed to the validity-of-estimation decision block 205. The validity-of-estimation decision block 205 decides a period, during which any of the cumulative magnitudes of jitters obtained by the cumulative summation block 201 takes on the minimum value, on the basis of the minimum value detected by the minimum value detection block 202. The validity-of-estimation decision block 205 outputs the validation/invalidation decision signal Sj which validates the period during which any of the cumulative magnitudes of jitters takes on the minimum value and invalidates the other period.

In the delay time estimation unit 112A shown in FIG. 7, the validity-of-estimation decision block 205 validates a period during which the cumulative magnitude of jitters obtained by the cumulative summation block 201 takes on the minimum value. However, not only the period during which the cumulative magnitude of jitters takes on the minimum value but also a period during which the cumulative magnitude of jitters falls within a certain range with respect to the minimum value may be validated.

In the delay time estimation unit 112A shown in FIG. 7, the shift value calculation block 203 calculates as a shift value the difference between the minimum value of the cumulative magnitudes of jitters and the minimum delay value. Therefore, during the period during which the cumulative magnitude of jitters takes on the minimum value and which is validated with the validation/invalidation decision signal Sj, the minimum delay value is outputted as the delay time Td from the shift computation block 204.

As mentioned above, in the time correction unit 113, during the period validated with the validation/invalidation decision signal Sj, compensated time calculating processing and time correcting processing are carried out. Therefore, the delay time Td obtained by the delay time estimation unit 112 should take on the minimum delay value during the period during which the cumulative magnitude of jitters takes on the minimum value and which is validated with the validation/invalidation decision signal Sj.

Figure 8:
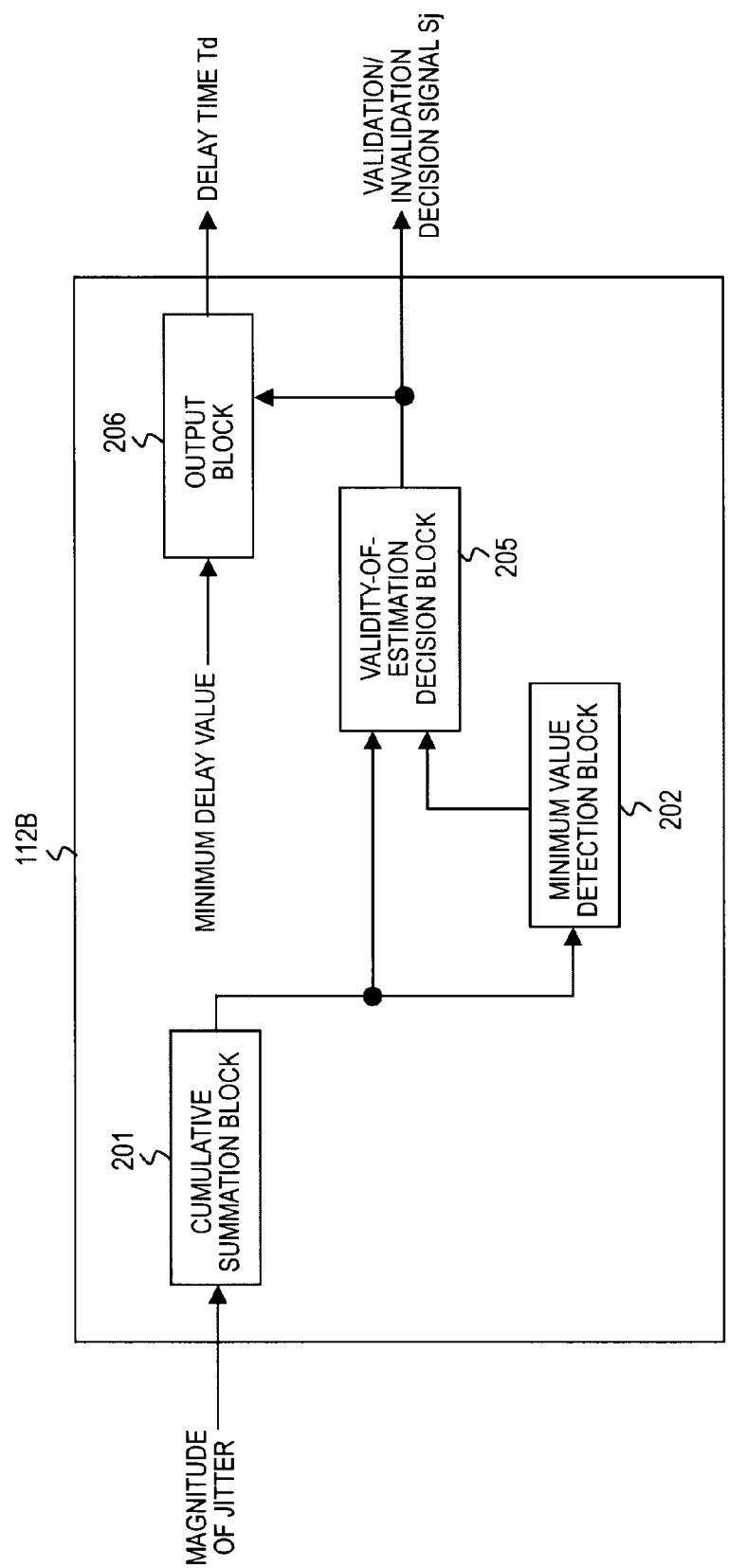
FIG. 8 is a block diagram showing another example of the configuration of the delay time estimation unit included in the second embodiment.

A delay time estimation unit 112B shown in FIG. 8 expresses, in consideration of the above description, another example of the configuration of the delay time estimation unit 112, which is included in the receiving apparatus 100B shown in FIG. 6. In FIG. 8, the same reference numerals are assigned to components identical to those shown in FIG. 7. An iterative description will be omitted.

The delay time estimation unit 112B includes a minimum value detection block 202, a validity-of-estimation decision block 205, and an output block 206. In the delay time estimation unit 112B, the configuration of a portion that outputs the validation/invalidation decision signal Sj is identical to that in the delay time estimation unit 112A shown in FIG. 7.

In the delay time estimation unit 112B, the output block 206 outputs the minimum delay value, which is measured and determined in advance, as a delay time Td. To the output block 206, the validation/invalidation decision signal Sj outputted from the validity-of-estimation decision block 205 is fed as a control signal. From the output block 206, the minimum delay value is outputted as the delay time Td during a period validated with the validation/invalidation decision signal Sj.

Incidentally, the output block 206 whose outputting is controlled with the validation/invalidation decision signal Sj may be excluded from the delay time estimation unit 112B shown in FIG. 8, and the minimum delay value may presumably be outputted as the delay time Td all the time.

Figure 9:
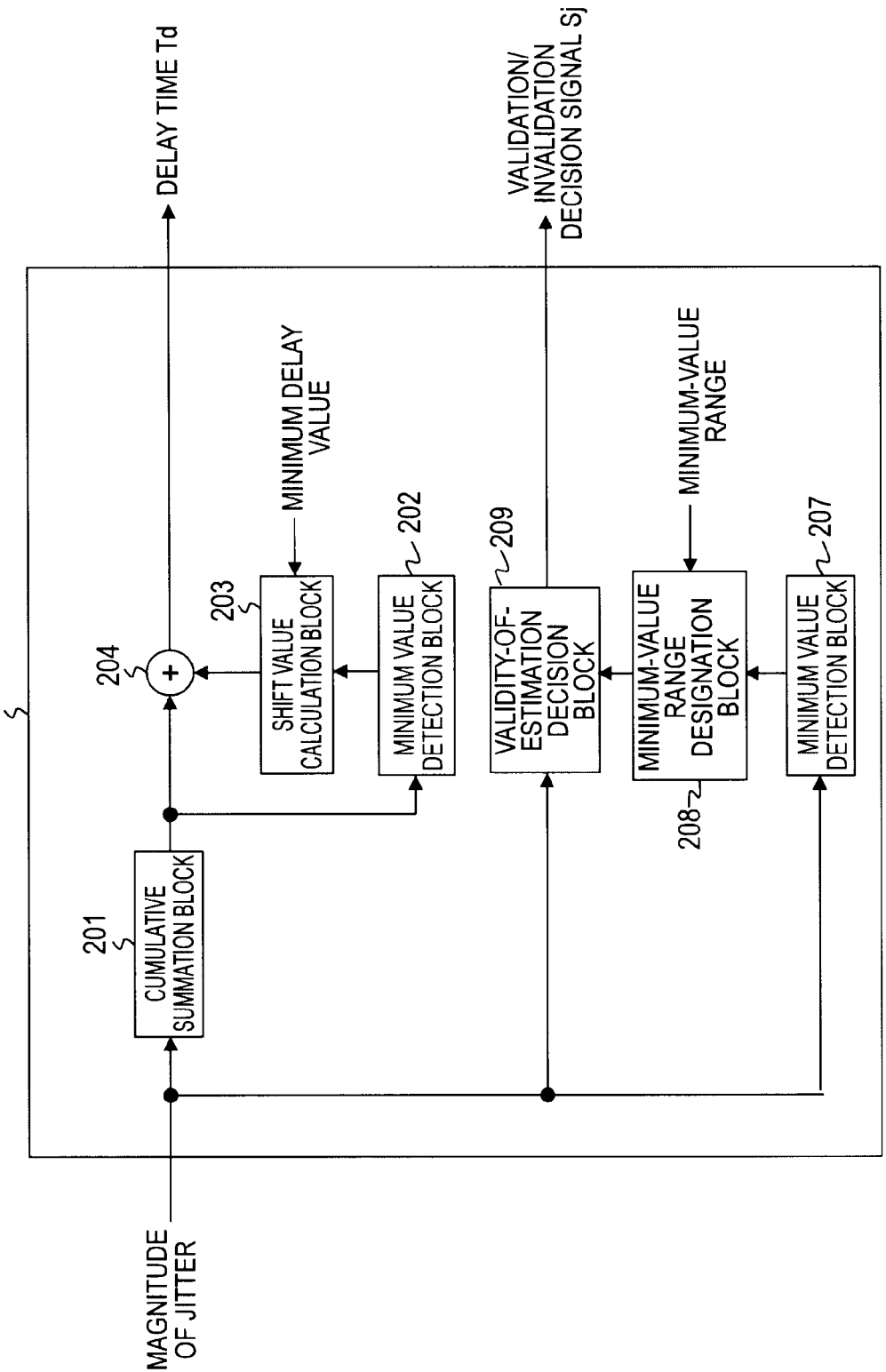
FIG. 9 is a block diagram showing still another example of the configuration of the delay time estimation unit included in the second embodiment.

A delay time estimation unit 112C shown in FIG. 9 expresses another example of the configuration of the delay time estimation unit 112 included in the receiving apparatus 100B shown in FIG. 6. In FIG. 9, the same reference numerals are assigned to components identical to those shown in FIG. 5.

The delay time estimation unit 112C includes a cumulative summation block 201, a minimum value detection block 202, a shift value calculation block 203, a shift computation block 204, a minimum value detection block 207, a minimum-value range designation block 208, and a validity-of-estimation decision block 209. The delay time estimation unit 112C is identical to the delay time estimation unit 110 shown in FIG. 5 except that the delay time estimation unit 112C further includes the minimum value detection block 207, minimum-value range designation block 208, and validity-of-estimation decision block 209. The minimum value detection block 207, minimum-value range designation block 208, and validity-of-estimation decision block 209 will be described below, and the description of the other components will be omitted.

The minimum value detection block 207 detects the minimum value of magnitudes of jitters calculated by the magnitude-of-jitter calculation unit 105 (see FIG. 6). The minimum-value range designation block 208 designates a minimum-value range for the magnitudes of jitters on the basis of the minimum value detected by the minimum value detection block 207 and a predesignated minimum-value range. In this case, assuming that the minimum value detected by the minimum value detection block 207 is, for example, −M ms, the minimum-value range designation block 208 estimates the maximum value of the magnitudes of jitters as +M ms so as to obtain a jitter variation width of +2M.

The predesignated minimum-value range is given as, for example, a ratio $\alpha$ to the jitter variation width. In this case, the minimum-value range designation block 208 uses the jitter variation width of +2M and the ratio $\alpha$, which are obtained as mentioned above, to designate as a minimum-value range a range from $-2M*\alpha$ to $+2M*\alpha$. In addition to detection of the minimum value of magnitudes of jitters which is performed as mentioned above, the maximum value of the magnitudes of jitters may be detected. The minimum value and maximum value may be used to calculate the jitter variation width.

The validity-of-estimation decision block 209 decides a period during which the magnitude of a jitter falls within the minimum-value range designated by the minimum-value range designation block 208. The validity-of-estimation decision block 209 outputs a validation/invalidation decision signal Sj which validates the period during which the magnitude of a jitter falls within the minimum-value range and invalidates the other period.

Actions to be performed in the delay time estimation unit 112C shown in FIG. 9 will be described below. Magnitudes of jitters calculated by the magnitude-of-jitter calculation unit 105 (see FIG. 6) are fed to the cumulative summation block 201. The cumulative summation block 201 cumulates and summates the magnitudes of jitters for each sample so as to obtain a cumulative magnitude of jitters. The cumulative magnitudes of jitters are fed to the minimum-value detection block 202 and shift computation block 204.

The minimum-value detection block 202 detects the minimum value of the cumulative magnitudes of jitters obtained by the cumulative summation block 201. The minimum value of the cumulative magnitudes of jitters is fed to the shift value calculation block 203. The shift value calculation block 203 calculates the difference between the minimum value of cumulative magnitudes of jitters and a predesignated minimum delay value so as to thus calculate a shift value.

The shift value calculated by the shift value calculation block 203 is fed to the shift computation block 204. The shift computation block 204 adds the shift value, which is calculated by the shift value calculation block 203, to the cumulative magnitude of jitters for each sample obtained by the cumulative summation block 201. Accordingly, the cumulative magnitudes of jitters for all samples are compensated for the shift value by the shift computation block 204, whereby the delay times (estimated delay times) Td of the samples are obtained.

The magnitudes of jitters calculated by the magnitude-of-jitter calculation unit 105 are fed to the minimum value detection block 207 and validity-of-estimation decision block 209. The minimum value detection block 207 detects the minimum value of the magnitudes of jitters calculated by the magnitude-of-jitter calculation unit 105. The minimum value of the magnitudes of jitters is fed to the minimum-value range designation block 208. The minimum-value range designation block designates the minimum-value range for the magnitudes of jitters on the basis of the minimum value detected by the minimum value detection block 207 and a predesignated minimum-value range (ratio α).

The minimum-value range designated by the minimum-value range designation block 208 is fed to the validity-of-estimation decision block 209. The validity-of-estimation decision block 209 decides a period, during which the magnitude of a jitter falls within the minimum-value range, on the basis of the minimum-value range designated by the minimum-value range designation block 208. The validity-of-estimation decision block 209 outputs a validation/invalidation decision signal Sj which validates the period during which the magnitude of a jitter falls within the minimum-value range and invalidates the other period.

As mentioned above, the shift value calculation block 203 calculates as a shift value the difference between the minimum value of cumulative magnitudes of jitters and a minimum delay value measured and determined in advance. Therefore, during a period during which a cumulative magnitude of jitters takes on the minimum value, the minimum delay value is outputted as a delay time Td from the shift computation block 204. The period during which the cumulative magnitude of jitters takes on the minimum value corresponds to, as apparent from FIG. 3, a period during which a magnitude of a jitter is nearly null and which is validated with the validation/invalidation decision signal Sj.

As mentioned above, during a period validated with the validation/invalidation decision signal Sj, the time correction unit 113 performs compensated time calculating processing and time correcting processing. Therefore, the delay time Td obtained by the delay time estimation unit 112 should merely take on the minimum delay value during a period during which a magnitude of a jitter falls within the minimum-value range and which is validated with the validation/invalidation decision signal Sj.

Figure 10:
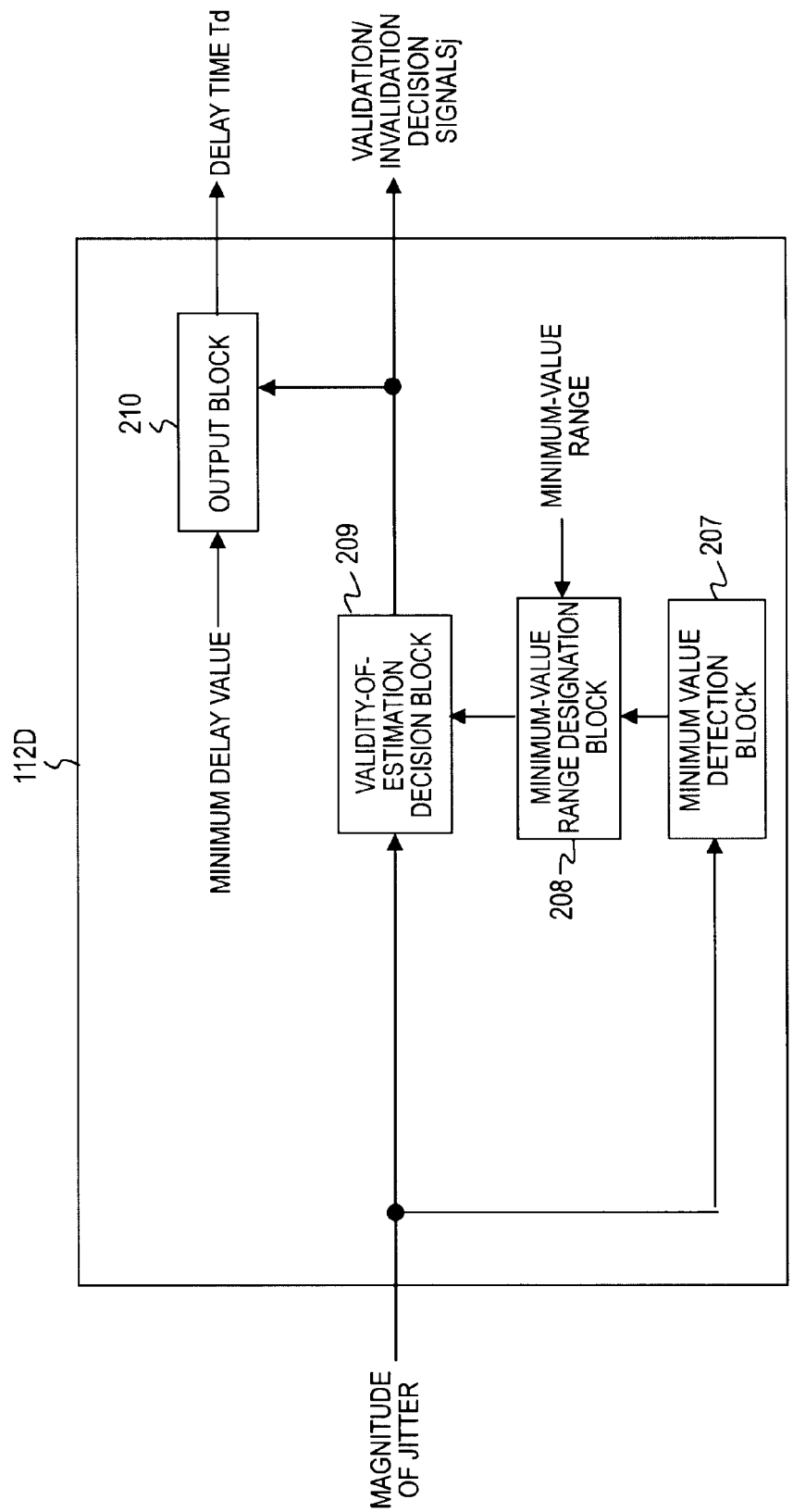
FIG. 10 is a block diagram showing still another example of the configuration of the delay time estimation unit included in the second embodiment.

A delay time estimation unit 112D shown in FIG. 10 expresses, in consideration of the above description, another example of the configuration of the delay time estimation unit 112 included in the receiving apparatus 100B shown in FIG. 6. In FIG. 10, the same reference numerals are assigned to components identical to those shown in FIG. 9, and the description of the components will be omitted.

The delay time estimation unit 112D includes a minimum value detection block 207, a minimum-value range designation block 208, a validity-of-estimation decision block 209, and an output block 210. In the delay time estimation unit 112D, the configuration of a portion that outputs a validation/invalidation decision signal Sj is identical to that in the delay time estimation unit 112C shown in FIG. 9.

In the delay time estimation unit 112D, the output block 210 outputs a minimum delay value, which is measured and determined in advance, as a delay time Td. To the output block 210, the validation/invalidation decision signal Sj outputted from the validity-of-estimation decision block 209 is fed as a control signal. From the output block 210, during a period validated with the validation/invalidation decision signal Sj, the minimum delay value is outputted as the delay time Td.

A configuration in which the output block 210 whose outputting is controlled with the validation/invalidation decision signal Sj is excluded from the delay time estimation unit 112D shown in FIG. 10 is also conceivable. In this case, the minimum delay value is outputted as the delay time Td all the time.

[Actions to be Performed in the Receiving Apparatus]

Time synchronizing actions be performed in the receiving apparatus 100B shown in FIG. 6 will be described below. Frequency control for a clock CLK to be implemented by a frequency-locked loop composed of the counter 108, receiving time recording unit 103, magnitude-of-jitter calculation unit 105, error calculation and DAC unit 106, and clock generation unit 107 is identical to that in the receiving apparatus 100A shown in FIG. 6.

Magnitudes of jitters calculated by the magnitude-of-jitter calculation unit 105 are fed to the delay time estimation unit 112. In the delay time estimation unit 112, the delay time Td of a sync packet received by the sync packet receiving unit 102 is estimated based on magnitudes of jitters. The delay time Td is a time elapsing until the sync packet sent from a transmitting apparatus is received by the sync packet receiving unit 102.

In the delay time estimation unit 112, the validation/invalidation decision signal Sj is outputted based on a magnitude of a jitter. For example, the validation/invalidation decision signal Sj validates a period during which a cumulative summation value of magnitudes of jitters takes on the minimum value, and invalidates the other period. For example, the validation/invalidation decision signal Sj validates a period during which a magnitude of a jitter falls within the minimum-value range and invalidates the other period.

The delay time Td of a sync packet estimated by the delay time estimation unit 112 is fed to the time correction unit 113. The validation/invalidation decision signal Sj outputted from the delay time estimation unit 112 is fed to the time correction unit 113. During a period validated with the decision signal Sj, the time correction unit 113 performs compensated time calculating processing and time correcting processing.

During compensated time calculating processing, the delay time Td is added to a transmitting time represented by time stamp data contained in a sync packet received by the sync packet receiving unit 102 in order to thus obtain a compensated time. During time correcting processing, a time (counter value) indicated by the clock unit 109 is rewritten with the compensated time (counter value), and is thus controlled to synchronize with the time indicated by the clock unit incorporated in the transmitting apparatus.

In the receiving apparatus 100B shown in FIG. 6, the delay time Td of a sync packet estimated based on magnitudes of jitters by the delay time estimation unit 112 includes a delay variation. Therefore, the compensated time obtained by the time correction unit 13 is a time obtained by compensating for the delay time including the variation. Accordingly, the time of the clock unit 109 rewritten and corrected with the compensated time has an adverse effect of the delay variation, which is incurred by the sync packet, minimized, and highly precisely synchronizes with the time indicated by the clock unit incorporated in the transmitting apparatus.

In the receiving apparatus 100B shown in FIG. 6, for example, in the delay time estimation unit 112 (112A or 112B), the decision signal that validates a period during which a cumulative magnitude of jitters takes on the minimum value, and invalidates the other period is outputted from the validity-of-estimation decision block 205. During the period validated with the decision signal Sj, the time correction unit 113 rewrites and corrects the time of the clock unit 109 with the compensated time.

The delay time of a sync packet sent over a LAN that is an asynchronous network includes a fixed element and a varying element. During a period during which a cumulative summation value of magnitudes of jitters is the minimum value, a stable state in which the delay time of a sync packet includes only the fixed element is attained, and the delay time of the sync packet takes on the minimum value of delay times. Therefore, as mentioned above, when the time indicated by the clock unit 109 is rewritten and corrected with the compensated time during the period validated with the decision signal Sj, the time can be highly precisely corrected.

In the receiving apparatus 100B shown in FIG. 6, for example, the delay time estimation unit 112 (112C or 112D) designates the minimum-value range for magnitudes of jitters on the basis of at least the minimum value of magnitudes of jitters calculated by the magnitude-of-jitter calculation unit 105. A decision signal Sj that validates a period during which the magnitude of a jitter calculated by the magnitude-of-jitter calculation unit 105 falls within the minimum-value range, and invalidates the other period is outputted from the validity-of-estimation decision block 209. During the period validated with the decision signal Sj, the time correction unit 113 rewrites and corrects the time of the clock unit 109 with the compensated time.

The delay time of a sync packet sent over a LAN that is an asynchronous network includes a fixed element and a varying element. During a period during which a magnitude of a jitter falls within the minimum-value range, a nearly stable state in which the varying element of the delay time of a sync packet is small is attained. Therefore, as mentioned above, when the time indicated by the clock unit 109 is rewritten and corrected with the compensated time during the period validated with the decision signal Sj, the time can be highly precisely corrected.

3. Third Embodiment

[Example of the Configuration of a Receiving Apparatus]

Figure 11:
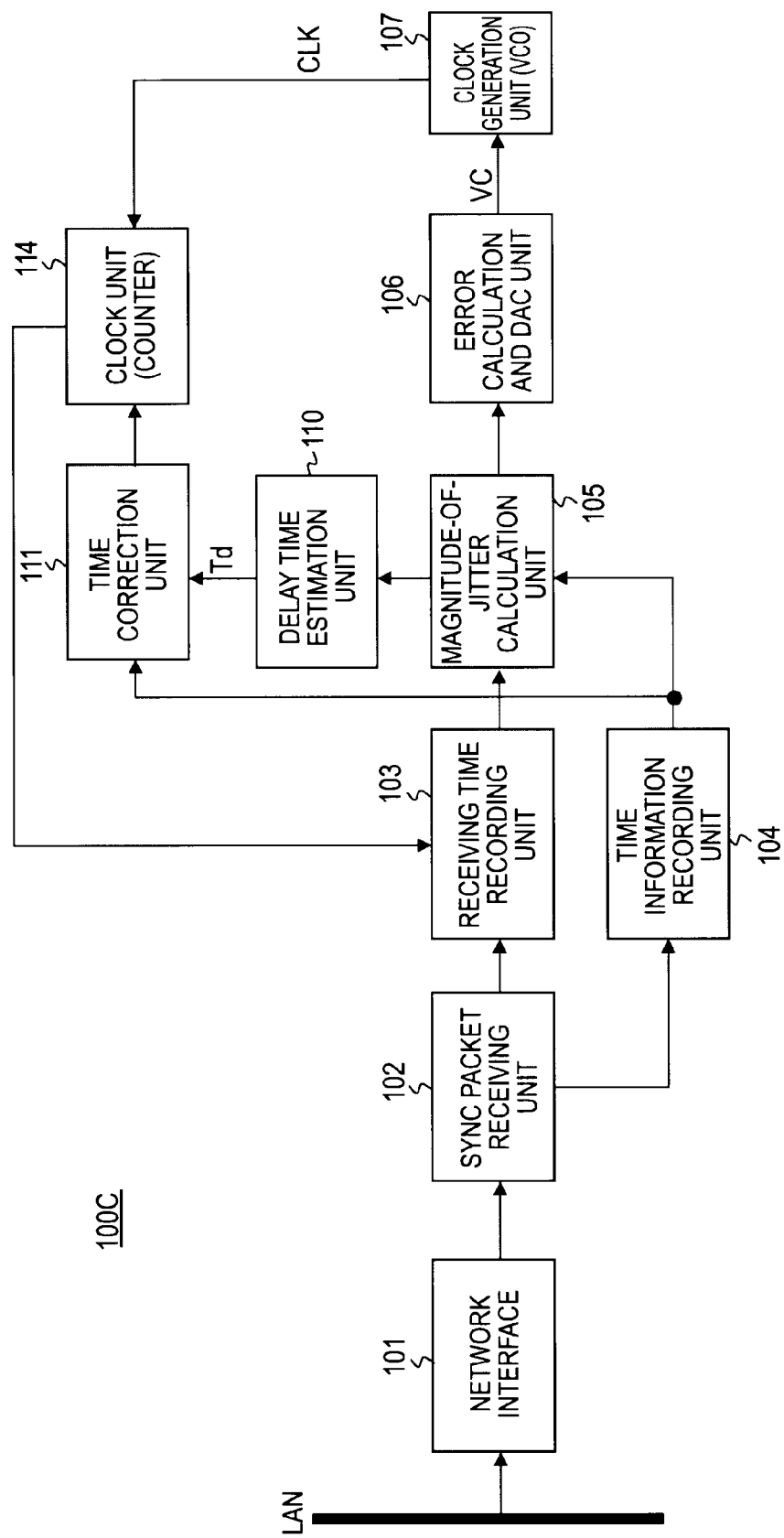
FIG. 11 is a block diagram showing an example of the configuration of a receiving apparatus in accordance with a third embodiment of the present invention.

FIG. 11 shows an example of the configuration of a receiving apparatus 100C in accordance with the third embodiment of the present invention. Even in FIG. 11, similarly to FIG. 1 and FIG. 6 showing the receiving apparatuses 100A and 100B respectively, only a portion of the receiving apparatus 100C relating to time synchronization is shown for brevity's sake. In FIG. 11, the same reference numerals are assigned to components identical to those shown in FIG. 1. An iterative description will be omitted.

The receiving apparatus 100C includes a network interface 101, a sync packet receiving unit 102, a receiving time recording unit 103, and a time information recording unit 104. The receiving apparatus 100C further includes a magnitude-of-jitter calculation unit 105, an error calculation and DAC unit 106, a clock generation unit 107, a clock unit (counter) 114, a delay time estimation unit 110, and a time correction unit 111. The receiving apparatus 100C is identical to the receiving apparatus 100A shown in FIG. 1 except that the clock unit (counter) 109 and counter 108 are replaced with the clock unit (counter) 114.

In the receiving apparatus 100A shown in FIG. 1, the receiving time recording unit 103 records a counter value, which is indicated by the counter 108 at a time point at which a sync packet is received by the sync packet receiving unit 102, as a receiving time. However, in the receiving apparatus 100C, the receiving time recording unit 103 records a counter value, which is indicated by the clock unit (counter) 114 at a time point at which a sync packet is received by the sync packet receiving unit 102, as the receiving time. In the receiving apparatus 100C, the clock unit (counter) 114, receiving time recording unit 103, magnitude-of-jitter calculation unit 105, error calculation and DAC unit 106, and clock generation unit 107 constitute a frequency-locked loop.

The other components of the receiving apparatus 100C and actions to be performed therein are identical to those of the receiving apparatus 100A shown in FIG. 1. Even the receiving apparatus 100C can provide the same advantage as the receiving apparatus 100A can. In the receiving apparatus 100C, since the clock unit (counter) 114 serves as a counter included in the frequency-locked loop, the configuration is simple.

Even the receiving apparatus 100B shown in FIG. 6 may have the same configuration as the receiving apparatus 100C does. Namely, even in the receiving apparatus 100B shown in FIG. 6, similarly to the receiving apparatus 100C, the clock unit (counter) 109 and counter 108 may be replaced with the clock unit (counter) 114.

4. Fourth Embodiment

[Example of the Configuration of a Receiving Apparatus]

Figure 12:
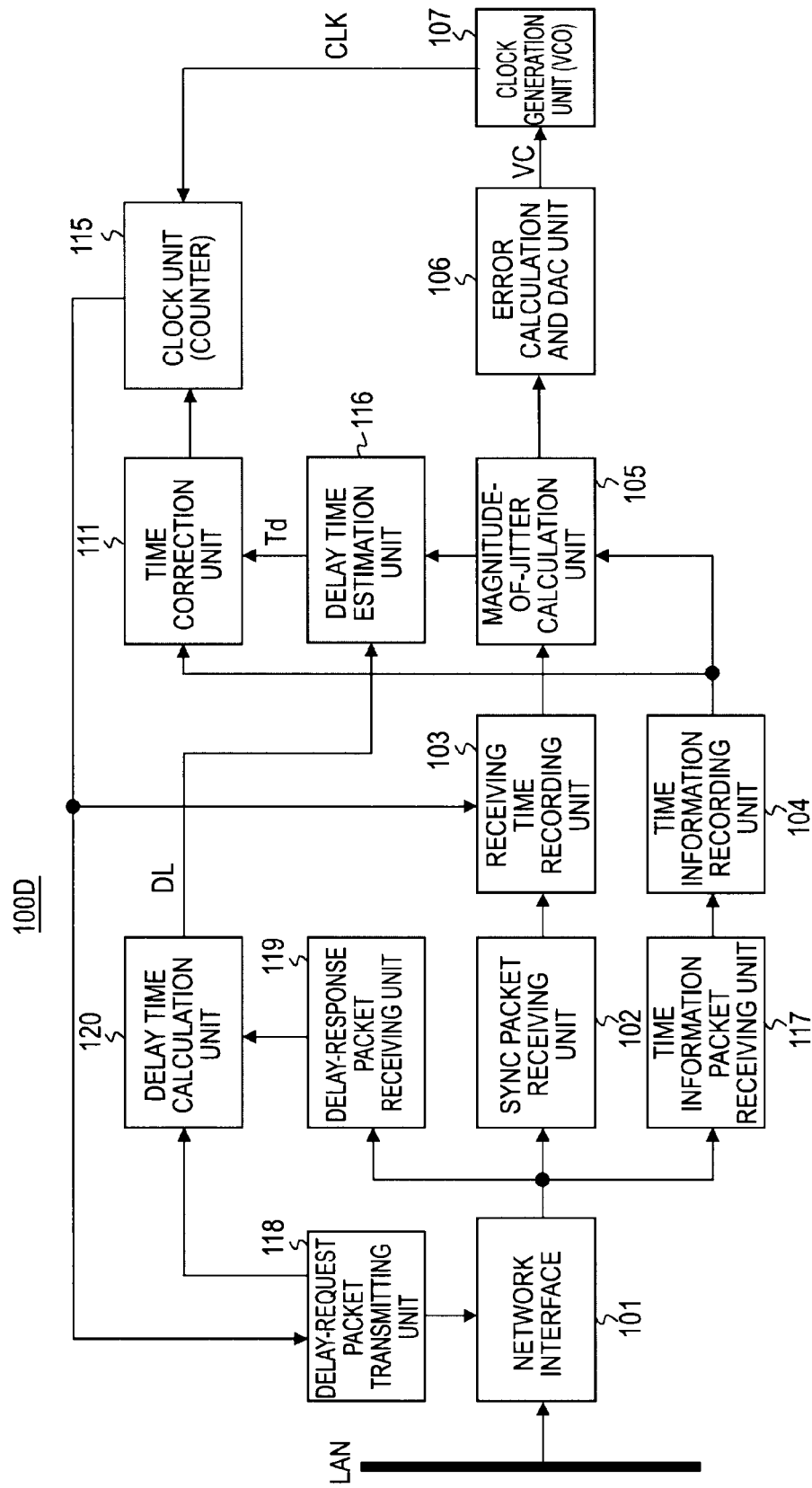
FIG. 12 is a block diagram showing an example of the configuration of a receiving apparatus in accordance with a fourth embodiment of the present invention.

FIG. 12 shows an example of the configuration of a receiving apparatus 100D in accordance with the fourth embodiment of the present invention. Even in FIG. 12, similarly to FIG. 1, FIG. 6, and FIG. 11 showing the receiving apparatuses 100A to 100C, only a portion of the receiving apparatus 100D relating to time synchronization is shown for brevity's sake. In FIG. 12, the same reference numerals are assigned to components identical to those shown in FIG. 1 and FIG. 11. An iterative description will be omitted.

The receiving apparatus 100D is a receiving apparatus compatible with the precision time protocol (PTP) stipulated in the IEEE 1588 standard. The IEEE 1588 PTP defines the structures of four message-type packets and a use procedure for them but does not define a method of implementing the protocol. Therefore, various configurations are conceivable for the receiving apparatus. A description will be made on the assumption that the receiving apparatus is of a type having a facility that performs time synchronization on the clock unit and a facility that locks a clock frequency.

Figure 13:
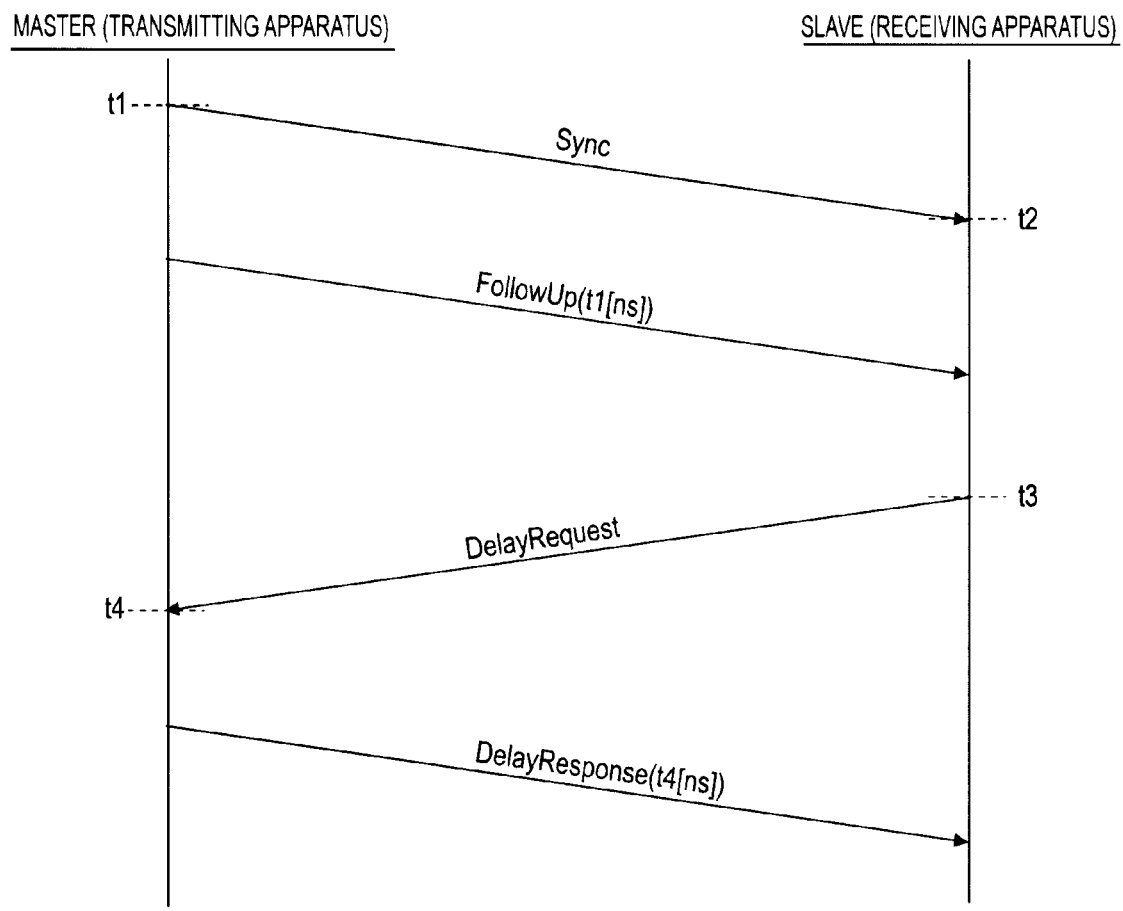
FIG. 13 is a diagram for use in explaining a PTP message.

Referring to FIG. 13, the PTP messages will be described below. The PTP messages include a synchronizing (sync) message, a follow-up message, a delay-request message, and a delay-response message.

A master (transmitting apparatus) transmits the sync message to a slave (receiving apparatus) so as to initiate actions for time synchronization. After transmitting the sync message, the master transmits the follow-up message to the slave so as to thus transmit time information. Therefore, the follow-up message contains time information representing a transmitting time t1 at which the master transmits the sync message. In FIG. 13, t2 denotes a receiving time at which the slave receives the sync message.

After receiving the follow-up message from the master, the slave transmits the delay-request message to the master so as to request the delay-response message. After receiving the delay-request message from the slave, the master transmits the delay-response message as a response to the slave. Therefore, the delay-response message contains time information representing a receiving time t4 at which the master receives the delay-request message. In FIG. 13, t3 denotes a transmitting time at which the slave transmits the delay-request message.

As shown in FIG. 12, the receiving apparatus 100D includes a network interface 101, a sync packet receiving unit 102, a receiving time recording unit 103, a time information recording unit 104, a magnitude-of-jitter calculation unit 105, an error calculation and DAC unit 106, and a clock generation unit 107. The receiving apparatus 100D further includes a time correction unit 111, a clock unit (counter) 115, a delay time estimation unit 116, a time information packet receiving unit 117, a delay request packet transmitting unit 118, a delay response packet receiving unit 119, and a delay time calculation unit 120.

The clock unit 115 outputs time information. The clock unit 115 is formed with a time synchronization counter that is stipulated in the PTP and that counts up responsively to a clock CLK generated by the clock generation unit 107. The time synchronization counter includes two counters of a second-unit counter and a nanosecond-unit counter. A counter value of the second-unit counter expresses seconds having been cumulated since an epoch. Time information (counter value) indicated by the clock unit 115 is fed to, for example, a synch signal generation unit that is not shown, and used to phase the sync signals, which are employed in the receiving and transmitting apparatuses respectively, with each other.

The sync packet receiving unit 102 receives a synchronizing (sync) message packet sent from a transmitting apparatus, which is not shown, via the network interface 101 over a LAN that is an asynchronous network. The receiving time recording unit 103 records as a receiving time a counter value (nanosecond-unit counter value) indicated by the clock unit 115 at a time point at which the sync message packet is received by the sync packet receiving unit 102.

The time information packet receiving unit 117 receives a follow-up message packet sent from the transmitting apparatus, which is not shown, via the network interface 101 over a LAN that is an asynchronous network. The time information recording unit 104 records a transmitting time of the sync message packet represented by time information contained in the follow-up message packet received by the time information packet receiving unit 117.

The magnitude-of-jitter calculation unit 105 calculates a magnitude of a jitter on the basis of the receiving times of two adjoining sync message packets received by the sync packet receiving unit 102 and the transmitting times thereof. Namely, the magnitude-of-jitter calculation unit 105 calculates as a magnitude of a jitter a difference between a first difference that is a difference between the receiving times and a second difference that is a difference between the transmitting times.

Now, t(1), t(2), etc. shall denote the receiving times of sync message packets received by the sync packet receiving unit 102. Likewise, s(1), s(2), etc. shall denote the transmitting times of sync message packets represented by pieces of time information contained in follow-up message packets received by the time information packet receiving unit 117. Herein, a numeral in parentheses denotes a sample number assigned to a sync message packet. For example, t(a) denotes the receiving time of a certain sync message packet, s(a) denotes the transmitting time thereof, t(b) denotes the receiving time of a subsequent sync message packet, and s(b) denotes the transmitting time thereof. At this time, the magnitude-of-jitter calculation unit 105 calculates a magnitude of a jitter according to an equation (7) presented below. The equation (7) corresponds to the aforesaid equation (2).

$$\text{Magnitude of a jitter} = t(b) - t(a) - (s(b) - s(a)) \quad (7)$$

After performing appropriate filtering processing on magnitudes of jitters calculated by the magnitude-of-jitter calculation unit 105, the error calculation and DAC unit 106 performs quantization, conversion into analog values, low-pass filtering processing in that order so as to produce an error voltage VC. The error calculation and DAC unit 106 feeds the error voltage VC as a control voltage for a clock frequency to the clock generation unit 107. The clock generation unit 107 generates, as mentioned above, the clock CLK to be fed to the clock unit 115. The clock generation unit 107 is formed using, for example, a voltage-controlled crystal oscillator (VCXO).

The delay time estimation unit 116 estimates the delay time Td of a sync packet (sync message packet) on the basis of the magnitude of a jitter calculated by the magnitude-of-jitter calculation unit 105 and a delay time DL calculated by the delay time calculation unit 120. The delay time estimation unit 116 will be detailed later.

Based on the delay time Td of a sync packet estimated by the delay time estimation unit 116, the time correction unit 111 compensates a transmitting time, which is represented by time information contained in the follow-up message packet received by the time information packet receiving unit 117, so as to obtain a compensated time. In this case, the time correction unit 111 adds the delay time Td, which is estimated by the delay time estimation unit 116 and associated with a transmitting time, to the transmitting time of a certain sync message packet so as to obtain the compensated time. The time correction unit 111 rewrites and corrects the time (counter value) of the clock unit 115 with the compensated time (counter value).

The delay request packet transmitting unit 118 transmits a delay-request message packet to the transmitting apparatus, which is not shown, via the network interface 101 over a LAN that is an asynchronous network. The delay response packet receiving unit 119 receives a delay-response message packet sent from the transmitting apparatus, which is not shown, via the network interface 101 over the LAN that is an asynchronous network.

The delay time calculation unit 120 calculates the delay time DL on the basis of the transmitting time at which a delay-request message packet is transmitted from the delay request packet transmitting unit 118, and a time represented by time information contained in a delay-response message packet received by the delay response packet receiving unit 119. The time represented by the time information contained in the delay-response message packet is, as mentioned above, a receiving time at which the delay-request message packet sent from the delay request packet transmitting unit 118 is received by the transmitting apparatus.

Assuming that t3 denotes the transmitting time of a delay-request message packet and t4 denotes the receiving time at which the delay-request message packet is received by the transmitting apparatus, the delay time calculation unit 120 obtains the delay time DL through the computation of t4-t3. The delay time DL corresponds to a magnitude of a network delay occurring in a direction from the receiving apparatus to the transmitting apparatus. Herein, the delay time DL is used for time correction on the assumption that the delay time DL is equal to a magnitude of a network delay occurring in a direction from the transmitting apparatus to the receiving apparatus. The delay request packet transmitting unit 118, delay response packet receiving unit, and delay time calculation unit 120 constitute a delay time measurement section.

[Example of the Configuration of the Delay Time Estimation Unit]

Figure 14:
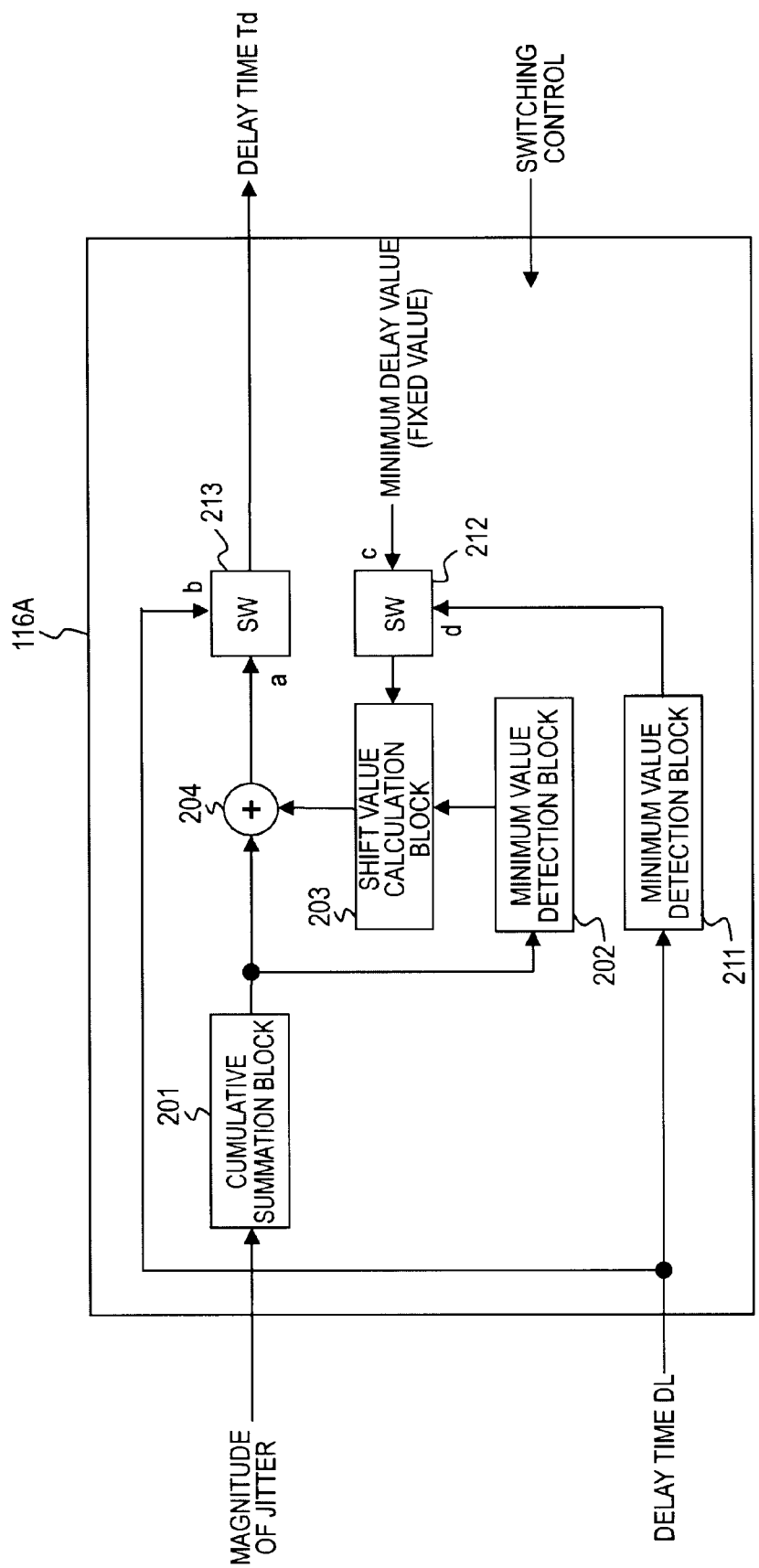
FIG. 14 is a block diagram showing an example of the configuration of a delay time estimation unit included in the fourth embodiment.

A delay time estimation unit 116A shown in FIG. 14 expresses an example of the configuration of the delay time estimation unit 116 included in the receiving apparatus 100D shown in FIG. 12. In FIG. 14, the same reference numerals are assigned to components identical to those shown in FIG. 5. An iterative description will be omitted. The delay time estimation unit 116A includes a cumulative summation block 201, a minimum value detection block 202, a shift value calculation block 203, a shift computation block 204, a minimum value detection block 211, and switches 212 and 213.

The cumulative summation block 201 cumulates and summates magnitudes of jitters calculated by the magnitude-of-jitter calculation unit 105 (see FIG. 12) so as to obtain a cumulative magnitude of jitters (cumulative summation value of magnitudes of jitters). The cumulative magnitude of jitters expresses, as described in relation to the principles of estimation of a delay time, a temporal variation relevant to each sample of a sync packet (sync message packet). The minimum value detection block 202 detects the minimum value of cumulative magnitudes of jitters obtained by the cumulative summation block 201.

The shift value calculation block 203 calculates a shift value by working out the difference between the minimum value of cumulative magnitudes of jitters detected by the minimum value detection block 202 and a minimum delay value fed from the switch 212. Assuming that B denotes the minimum value of cumulative magnitudes of jitters and C denotes the minimum delay value, the shift value calculation block 203 calculates (C−B) as the shift value (see FIG. 3).

The shift computation block 204 adds the shift value, which is calculated by the shift value calculation block 203, to the cumulative magnitude of jitters for each sample obtained by the cumulative summation block 201. In this case, the cumulative magnitudes of jitters for all samples are compensated for the shift value by the shift computation block 204, whereby the delay times (estimated delay times) of the samples that are sync packets (sync message packets) are obtained.

The minimum value detection block 211 detects the minimum value of delay times DL calculated by the delay time calculation unit 120 (see FIG. 12). The minimum value detection block 211 detects the minimum value of the delay times of a certain number of samples, and sequentially updates the minimum value of delay times DL. Herein, the delay time DL takes on the minimum value (variation value) of delay times measured and determined by the delay time measurement section.

The switch 212 selectively fetches the minimum value (minimum delay value) of delay times, which are inputted to an input terminal c thereof or an input terminal d thereof, through switching control implemented based on a user's selecting manipulation performed at a user operating unit that is not shown, and feeds the minimum value to the shift value calculation block 203. The minimum value (fixed value) of delay times measured and determined in advance is inputted to the input terminal c of the switch 212. To the input terminal d of the switch 212, the minimum value (varying value) of delay times DL obtained by the delay time calculation unit 120, which is detected by the minimum value detection block 211, is inputted.

The switch 213 selectively fetches a delay time, which is inputted to an input terminal a thereof or an input terminal b thereof, through switching control implemented based on a user's selecting manipulation performed at the user operating unit that is not shown, and outputs the delay time as a delay time Td. To the input terminal a of the switch 213, the delay time (estimated delay time) of each sample, which is a sync packet (sync message packet), obtained by the shift computation block 204 is inputted. To the input terminal b of the switch 213, the delay time DL of each sample, which is a sync packet (sync message packet), calculated by the delay time calculation unit 120 is inputted.

Actions to be performed in the delay time estimation unit 116A shown in FIG. 14 will be described below.

To begin with, a state in which the input terminal b of the switch 213 is selected will be described. This state is adopted for the purpose of use for which the general facilities stipulated in the PTP can provide satisfactory precision for time synchronization. In this state, the delay time DL of each sample, which is a sync packet (sync message packet), calculated by the delay time calculation unit 120 (see FIG. 12) is outputted as a delay time Td via the switch 213.

Next, a state in which the input terminal a of the switch 213 is selected will be described. The state is adopted for the purpose of use for which precision in time synchronization higher than precision provided by the general facilities stipulated in the PTP is necessary. For example, the state is used in a case where a network delay occurring in a direction from the receiving apparatus to the transmitting apparatus is different from a network delay occurring in a direction from the transmitting apparatus to the receiving apparatus. For example, the state is used in a case where a network delay changes between a sync message packet and a subsequent delay-request message packet.

The foregoing state falls into a first state in which the input terminal c of the switch 212 is selected and a second state in which the input terminal d of the switch 212 is selected.

The first state is adopted in, for example, a case where network elements are identical to those employed when the minimum delay value (fixed value) is measured. The second state is adopted in a case, for example, where network elements are different from those employed when the minimum delay value (fixed value) is measured. The case where network elements are different is, for example, a case where the length of a LAN cable is largely changed.

A description will be made of the first state, that is, a state in which the input terminal a of the switch 213 is selected and the input terminal c of the switch 212 is selected. The state corresponds to the state of the delay time estimation unit 110 shown in FIG. 5.

To be more specific, magnitudes of jitters calculated by the magnitude-of-jitter calculation unit 105 (see FIG. 12) are fed to the cumulative summation block 201. The cumulative summation block 201 cumulates and summates magnitudes of jitters for each sample so as to obtain a cumulative magnitude of jitters (a cumulative summation value of magnitudes of jitters). The cumulative magnitudes of jitters are fed to the minimum value detection block 202 and shift computation block 204.

The minimum value detection block 202 detects the minimum value of the cumulative magnitudes of jitters obtained by the cumulative summation block 201. The minimum value of the cumulative magnitudes of jitters is fed to the shift value calculation block 203. The shift value calculation block 203 calculates the difference between the minimum value of the cumulative magnitudes of jitters and a minimum delay value (fixed value) fed via the switch 212, and thus calculates a shift value.

The shift value calculated by the shift value calculation block 203 is fed to the shift computation block 204. The shift computation block 204 adds the shift value, which is calculated by the shift value calculation block 203, to the cumulative magnitude of jitters for each sample obtained by the cumulative summation block 201.

Accordingly, the cumulative magnitudes of jitters for samples that are sync packets (sync message packets) are compensated for the shift value by the shift computation block 204, whereby delay times (estimated delay times) are obtained. The delay times of samples, which are sync packets (sync message packets), thus obtained by the shift computation block 204 are outputted as delay times Td via the switch 213.

Next, a description will be made of the second state, that is, a state in which the input terminal a of the switch 213 is selected and the input terminal d of the switch 212 is selected.

Specifically, magnitudes of jitters calculated by the magnitude-of-jitter calculation unit 105 (see FIG. 12) are fed to the cumulative summation block 201. The cumulative summation block 201 cumulates and summates magnitudes of jitters for each sample so as to obtain a cumulative magnitude of jitters (a cumulative summation value of magnitudes of jitters). The cumulative magnitudes of jitters are fed to the minimum value detection block 202 and shift computation block 204. The minimum value detection block 202 detects the minimum value of cumulative magnitudes of jitters obtained by the cumulative summation block 201. The minimum value of cumulative magnitudes of jitters is fed to the shift value calculation block 203.

Delay times DL calculated by the delay time calculation unit 120 (see FIG. 12) are fed to the minimum value detection block 211. The minimum value detection block 211 detects the minimum value of delay times DL, which are calculated by the delay time calculation unit 120, in units of a certain number of samples. The minimum value of delay times DL is fed to the shift value calculation block 203 via the switch 212. The shift value calculation block 203 calculates the difference between the minimum value of cumulative magnitudes of jitters and the minimum value (varying value) of delay times DL so as to thus calculate a shift value.

The shift value calculated by the shift value calculation block 203 is fed to the shift computation block 204. The shift computation block 204 adds the shift value, which is calculated by the shift value calculation block 203, to the cumulative magnitudes of jitters for samples obtained by the cumulative summation block 201. Thus, the cumulative magnitudes of jitters for samples that are sync packets (sync message packets) are compensated for the shift value by the shift computation block 204, whereby delay times (estimated delay times) are obtained. The delay times of samples, which are sync packets (sync message packets), obtained by the shift computation block 204 are outputted as delay times Td via the switch 213.

[Actions to be Performed in the Receiving Apparatus]

Time synchronizing actions to be performed in the receiving apparatus 100D shown in FIG. 12 will be described below.

When a sync message packet sent from the transmitting apparatus via the network interface 101 over a LAN is received by the sync packet receiving unit 102, a counter value of the clock unit 115 is recorded as a receiving time in the receiving time recording unit 103. When a follow-up message packet is received by the time information packet receiving unit 117, a transmitting time represented by time information contained in the packet is recorded in the time information recording unit 104.

The magnitude-of-jitter calculation unit 105 uses the receiving times recorded in the receiving time recording unit 103 and the transmitting times recorded in the time information recording unit 104 to calculate magnitudes of jitters according to the equation (7) to which the receiving times and transmitting times of two adjoining sync message packets are assigned. The magnitude of a jitter corresponds to an error in a clock frequency between transmitting and receiving sides under a situation under which time synchronization is unsusceptible to a variation in the delay time of a sync packet occurring over a network. Under a situation under which time synchronization is susceptible to the variation in the delay time of a sync packet occurring over a network, the magnitude of a jitter corresponds to a combination of the error in the clock frequency between the transmitting and receiving sides and an adverse effect of the variation in the delay time.

The magnitudes of jitters calculated by the magnitude-of-jitter calculation unit 105 are fed to the error calculation and DAC unit 106 and delay time estimation unit 116. After performing appropriate filtering processing on the magnitudes of jitters, the error calculation and DAC unit 106 performs quantization, conversion into analog values, and low-pass filtering processing in that order so as to produce an error voltage VC. The error voltage VC is fed to the clock generation unit 107, whereby the frequency of a clock CLK to be generated by the clock generation unit 107 is controlled. The clock unit (counter) 115, receiving time recording unit 103, magnitude-of-jitter calculation unit 105, error calculation and DAC unit 106, and clock generation unit 107 constitute a frequency-locked loop.

A delay-request message packet is transmitted from the delay request packet transmitting unit 118 to the transmitting apparatus, which is not shown, via the network interface 101 over a LAN that is an asynchronous network. In this case, a counter value of the clock unit 115 is recorded as a transmitting time in the delay request packet transmitting unit 118. A delay-request message packet sent from the transmitting apparatus via the network interface 101 over the LAN is received by the delay response packet receiving unit 119. In this case, a receiving time represented by time information contained in the delay-response message packet is recorded in the delay response packet receiving unit 119.

The delay time calculation unit 120 calculates a delay time DL (=t4−t3) on the basis of the transmitting time t3 recorded in the delay request packet transmitting unit 118 and the receiving time t4 recorded in the delay response packet receiving unit 119. The delay time DL thus calculated by the delay time calculation unit 120 is fed to the delay time estimation unit 116.

The delay time estimation unit 116 estimates the delay time Td of a sync packet (sync message packet) on the basis of the magnitudes of jitters calculated by the magnitude-of-jitter calculation unit 105 and the delay time DL calculated by the delay time calculation unit 120 (see FIG. 14). The delay time Td is a time elapsing until the sync packet (sync message packet) sent from the transmitting apparatus is received by the sync packet receiving unit 102.

The delay time Td of the sync packet estimated by the delay time estimation unit 116 is fed to the time correction unit 111. The time correction unit 111 adds the delay time Td of the sync packet, which is estimated by the delay time estimation unit 116, to the transmitting time represented by time information contained in the follow-up message package received by the time information packet receiving unit 117 so as to obtain a compensated time. The time correction unit 111 rewrites the time (counter value) of the clock unit 115 with the compensated time (counter value), whereby the time indicated by the clock unit 115 is controlled to synchronize with the time indicated by the clock unit incorporated in the transmitting apparatus.

When the input terminal a of the switch 213 included in the delay time estimation unit 116 is selected, the processing of estimating the delay time Td to be performed by the delay time estimation unit 116 and the processing of correcting the time of the clock unit 115 to be performed by the time correction unit 111 are carried out after a frequency-locked state is attained. The frequency-locked state is attained when the offsets offset(1), offset(2), offset(3), offset(4), etc. are equal to one another. In this state, the cumulative magnitude of jitters corresponds to, as described in relation to the principles of estimation of a delay time, a variation in a delay of a sample that is a sync packet (refer to the equation (6)).

In the receiving apparatus 100D shown in FIG. 12, the delay time Td of a sync packet estimated by the delay time estimation unit 116 includes a delay variation. Therefore, the compensated time obtained by the time correction unit 111 is a time obtained by compensating for the delay time including the variation. Eventually, the time of the clock unit 115 rewritten and corrected with the compensated time has an adverse effect of the delay variation, which is incurred by the sync packet (sync message packet), minimized, and highly precisely synchronizes with the time of the clock unit incorporated in the transmitting apparatus.

5. Variants

The delay time estimation unit 116 included in the fourth embodiment may be, similarly to the delay time estimation unit 112 included in the second embodiment, designed to output, in addition to the delay time Td, the validation/invalidation decision signal Sj. In this case, the time correction unit 111 performs compensated time calculating processing and time correcting processing during a period validated with the decision signal Sj.

Figure 15:
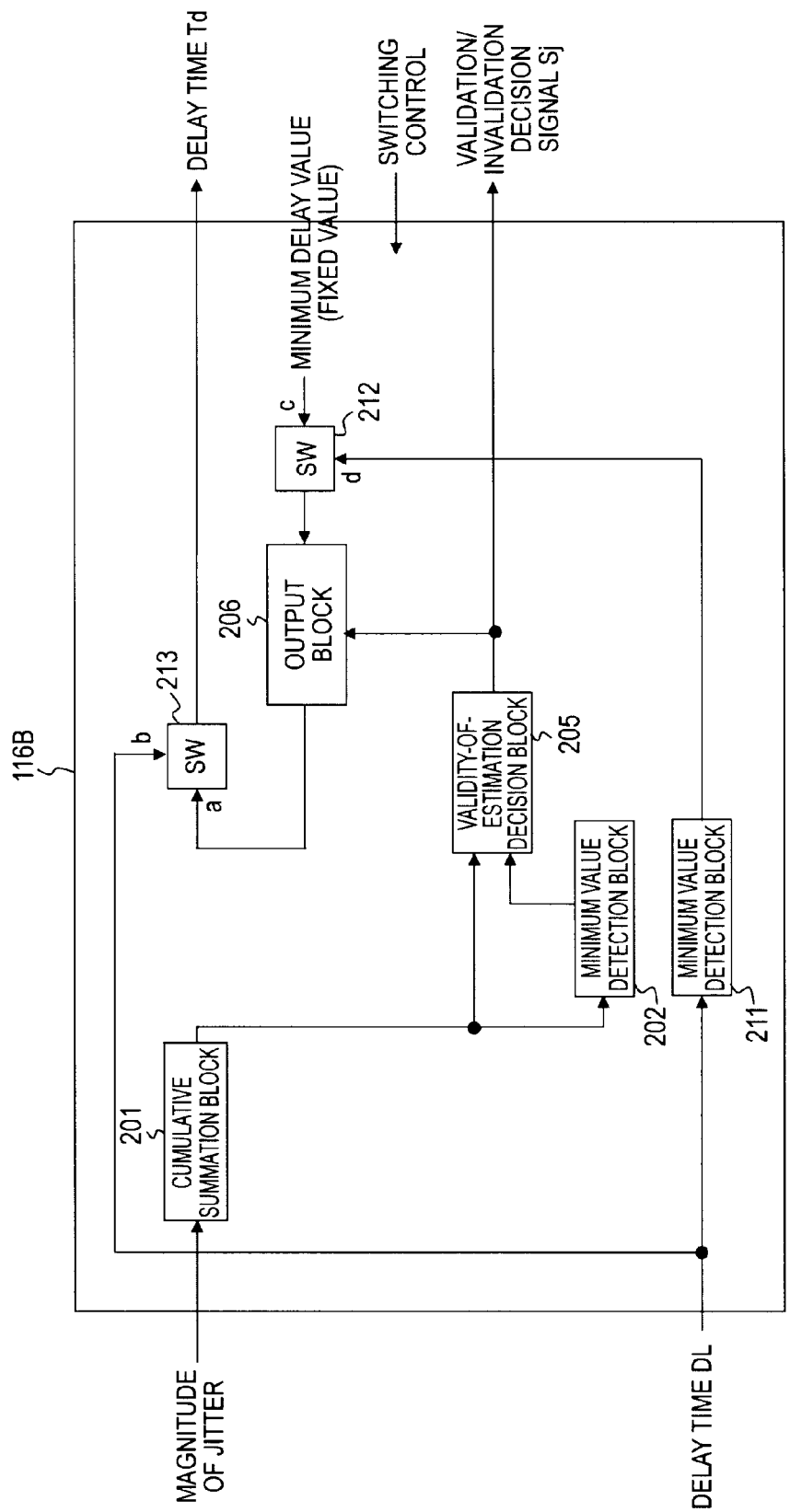
FIG. 15 is a block diagram showing another example of the configuration of the delay time estimation unit included in the fourth embodiment.

A delay time estimation unit 116B shown in FIG. 15 expresses the configuration of the delay time estimation unit 116 shown in FIG. 14 similar to that of the delay time estimation unit 112B shown in FIG. 8. In FIG. 15, the same reference numerals are assigned to components identical to those shown in FIG. 14 and FIG. 8, though the details thereof will be omitted.

Figure 16:
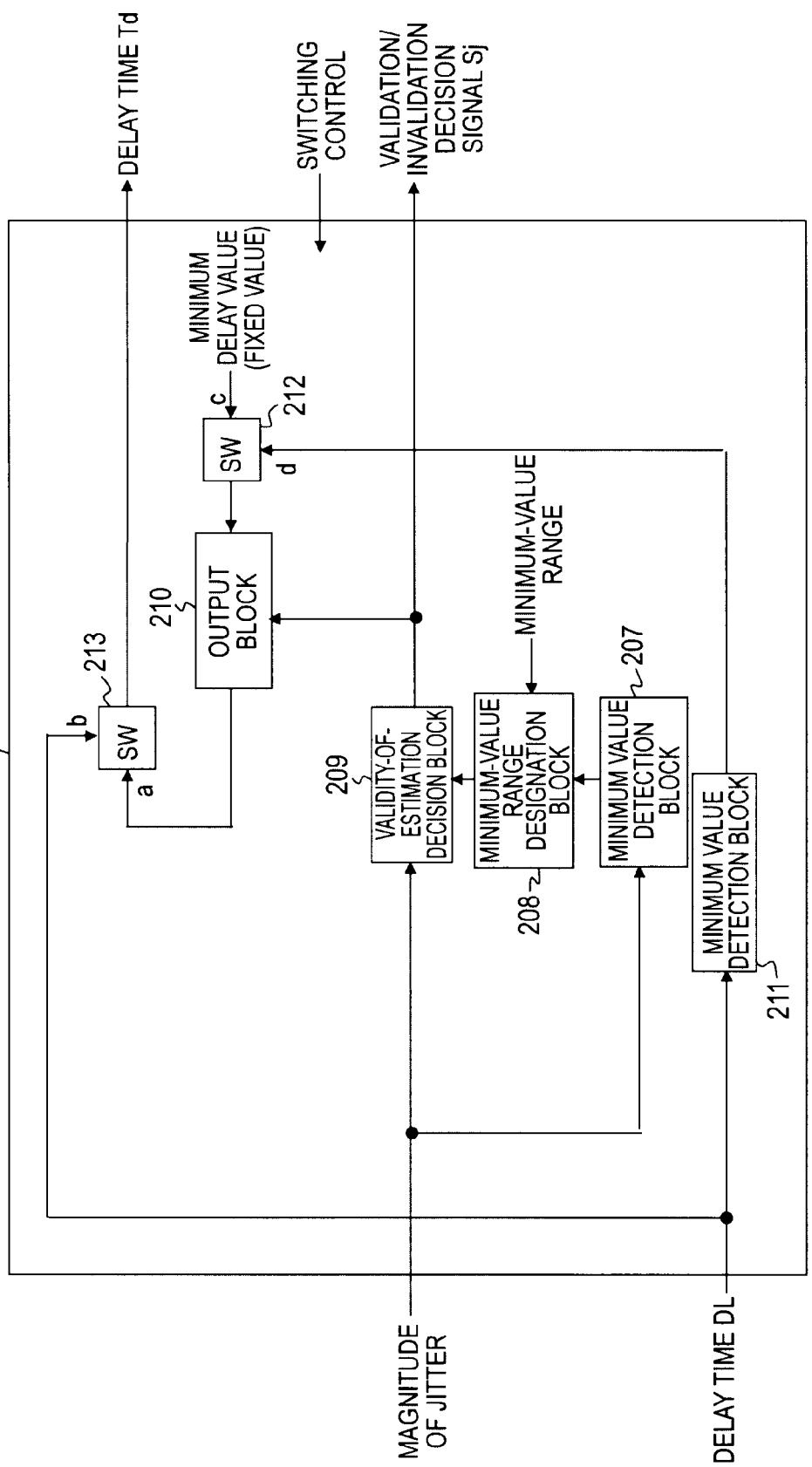
FIG. 16 is a block diagram showing still another example of the configuration of the delay time estimation unit included in the fourth embodiment.
Figure 17:
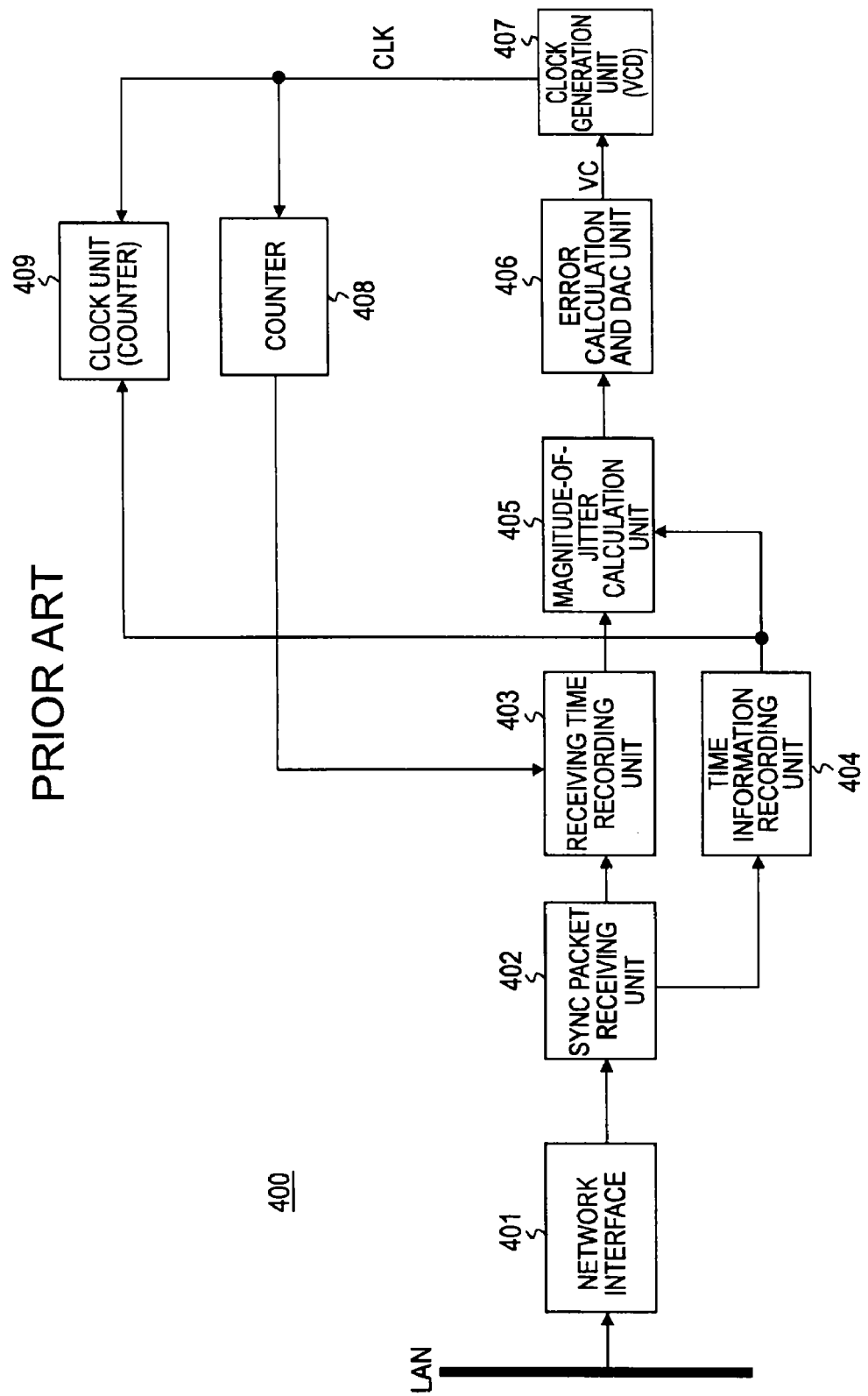
FIG. 17 is a block diagram showing an example of the configuration of a receiving apparatus in accordance with a related art.

A delay time estimation unit 116C shown in FIG. 16 expresses the configuration of the delay time estimation unit 116 shown in FIG. 14 similar to that of the delay time estimation unit 112D shown in FIG. 10. In FIG. 16, the same reference numerals are assigned to components identical to those shown in FIG. 14 and FIG. 10, though the details thereof will be omitted.

In the fourth embodiment, the delay time measurement section is designed to calculate the delay time DL by utilizing the transmitting time and receiving time of a delay-request message packet stipulated in the PTP. However, the delay time measurement section to be included in the present invention is not limited to this one but may be differently designed. For example, the delay time measurement section may be designed to calculate a delay time by utilizing the transmitting time of a sync message packet and the receiving time thereof.

According to the present invention, when a time indicated by a clock unit is corrected by utilizing a sync packet, an adverse effect of a delay variation incurred by the sync packet can be minimized. Therefore, the present invention can be applied to, for example, a camera system in which times indicated by plural video cameras have to be synchronized with one another, and a control system in which times indicated by control equipment and controlled equipment respectively have to be synchronized with each other.

The present application contains subject matter related to that disclosed in Japanese Priority Patent Application JP 2009-076742 filed in the Japan Patent Office on Mar. 26, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving apparatus comprising:
   a clock unit that outputs time information;
   a synchronizing (sync) packet receiving unit that receives a sync packet which contains transmitting time information and which is sent from a transmitting apparatus over an asynchronous network;
   a magnitude-of-jitter calculation unit that calculates as a magnitude of a jitter a difference between a first difference, which is a difference between the receiving times of two adjoining sync packets received by the sync packet receiving unit, and a second difference which is a difference between the transmitting times of the two sync packets;
   a delay time estimation unit that obtains the delay time of the sync packet on the basis of magnitudes of jitters calculated by the magnitude-of-jitter calculation unit; and
   a time correction unit that compensates the transmitting time of the sync packet, which is received by the sync packet receiving unit, on the basis of the delay time of the sync packet, which is obtained by the delay time estimation unit, so as to obtain a compensated time, and rewrites and corrects the time of the clock unit with the compensated time.

2. The receiving apparatus according to claim 1, wherein the delay time estimation unit comprises:
   a cumulative summation block that cumulates and summates magnitudes of jitters calculated by the magnitude-of-jitter calculation unit so as to obtain a cumulative summation value of magnitudes of jitters;
   a minimum value detection block that detects the minimum value of the cumulative summation values of magnitudes of jitters obtained by the cumulative summation block; and
   a shift block that shifts the cumulative summation value of magnitudes of jitters, which is obtained by the cumulative summation block, so that the minimum value detected by the minimum value detection block will be equal to the minimum value of delay times, and thus obtains the delay time of the sync packet.

3. The receiving apparatus according to claim 2, wherein:
   the delay time estimation unit further includes a validity-of-estimation decision block that outputs a decision signal which validates a period during which the cumulative summation value of magnitudes of jitters obtained by the cumulative summation block is the minimum value detected by the minimum value detection block, and invalidates the other period; and
   during the period validated with the decision signal outputted from the validity-of-estimation decision block, the time correction unit rewrites and corrects the time of the clock unit with the compensated time.

4. The receiving apparatus according to claim 2, wherein:
   the delay time estimation unit further includes a designation block that designates a minimum-value range for magnitudes of jitters on the basis of at least the minimum value of the magnitudes of jitters calculated by the magnitude-of-jitter calculation unit, and a validity-of-estimation decision block that outputs a decision signal which validates a period during which the magnitude of a jitter calculated by the magnitude-of-jitter calculation unit falls within the minimum-value range designated by the designation block, and invalidates the other period; and
   during the period validated with the decision signal outputted from the validity-of-estimation decision block, the time correction unit rewrites and corrects the time of the clock unit with the compensated time.

5. The receiving apparatus according to claim 2, wherein the minimum value of delay times employed by the shift block is a fixed value measured and determined in advance.

6. The receiving apparatus according to claim 2, wherein the minimum value of delay times employed by the shift block is a varying value measured and determined by a delay time measurement section.

7. The receiving apparatus according to claim 6, wherein the delay time measurement section calculates as a delay time a difference between a first time, which is a time at which a delay-request packet is transmitted to the transmitting apparatus, and a second time that is a time which is represented with time information contained in the delay-response packet received from the transmitting apparatus responsively to the transmission of the delay-request packet and at which the transmitting apparatus receives the delay-request packet, and detects the minimum value of such delay times as the minimum value of delay times.

8. The receiving apparatus according to claim 2, wherein:
the delay time estimation unit includes a switch that selectively fetches the minimum value of delay times which is a fixed value measured and determined in advance, or the minimum value of delay times which is a varying value measured and determined by the delay time measurement section; and
the minimum value of delay times employed by the shift block is the minimum value of delay times fetched by the switch.

9. The receiving apparatus according to claim 1, wherein:
the delay time estimation unit includes
a cumulative summation block that cumulates and summates magnitudes of jitters calculated by the magnitude-of-jitter calculation unit so as to obtain a cumulative summation value of magnitudes of jitters,
a minimum value detection block that detects the minimum value of the cumulative summation values of magnitudes of jitters obtained by the cumulative summation block,
a validity-of-estimation decision block that outputs a decision signal which validates a period during which the cumulative summation value of magnitudes of jitters obtained by the cumulative summation block is the minimum value detected by the minimum value detection block, and invalidates the other period, and
an output block that during the period validated with the decision signal outputted from the validity-of-estimation decision block, outputs the minimum value of delay times as the delay time of a sync packet; and
during the period validated with the decision signal outputted from the validity-of-estimation decision block, the time correction unit rewrites and corrects the time of the clock unit with the compensated time.

10. The receiving apparatus according to claim 9, wherein the minimum value of delay times employed by the output block is a fixed value measured and determined in advance.

11. The receiving apparatus according to claim 9, wherein the minimum value of delay times employed by the output block is a varying value measured and determined by the delay time measurement section.

12. The receiving apparatus according to claim 9, wherein:
the delay time estimation unit includes a switch that selectively fetches the minimum value of delay times which is a fixed value measured and determined in advance, or the minimum value of delay times which is a varying value measured and determined by the delay time measurement section; and
the minimum value of delay times employed by the output block is the minimum value of delay times fetched by the switch.

13. The receiving apparatus according to claim 1, wherein:
the delay time estimation unit includes
a designation block that designates a minimum-value range for magnitudes of jitters on the basis of at least the minimum value of the magnitudes of jitters calculated by the magnitude-of-jitter calculation unit,
a validity-of-estimation decision block that outputs a decision signal which validates a period during which the magnitude of a jitter calculated by the magnitude-of-jitter calculation unit falls within the minimum-value range designated by the designation block, and invalidates the other period, and
an output block that outputs the minimum value of delay times as the delay time of a sync packet during the period validated with the decision signal outputted from the validity-of-estimation decision block; and
during the period validated with the decision signal outputted from the validity-of-estimation decision block, the time correction unit rewrites and corrects the time of the clock unit with the compensated time.

14. The receiving apparatus according to claim 13, wherein the minimum value of delay times employed by the output block is a fixed value measured and determined in advance.

15. The receiving apparatus according to claim 13, wherein the minimum value of delay times employed by the output block is a varying value measured and determined by the delay time measurement section.

16. The receiving apparatus according to claim 13, wherein:
the delay time estimation unit includes a switch that selectively fetches the minimum value of delay times, which is a fixed value measured and determined in advance, or the minimum value of delay times which is a varying value measured and determined by the delay time measurement section; and
the minimum value of delay times employed by the output block is the minimum value of delay times fetched by the switch.

17. A time correction method for a receiving apparatus including a clock unit that outputs time information, comprising the steps of:
receiving a sync packet that contains transmitting time information and is sent from a transmitting apparatus over an asynchronous network;
calculating as a magnitude of a jitter a difference between a first difference, which is a difference between the receiving times of two adjoining sync packets received at the sync packet receiving step, and a second difference that is a difference between the transmitting times of the two sync packets;
obtaining the delay time of the sync packet on the basis of the magnitudes of jitters calculated at the magnitude-of-jitter calculating step; and
compensating the transmitting time of the sync packet, which is received at the sync packet receiving step, on the basis of the delay time of the sync packet obtained at the delay time estimating step, so as to obtain a compensated time, and rewriting and correcting the time of the clock unit with the compensated time.

* * * * *